United States Patent [19]

Fletcher, Jr. et al.

[11] Patent Number: 4,550,532

[45] Date of Patent: Nov. 5, 1985

[54] AUTOMATED MACHINING METHOD

[75] Inventors: George R. Fletcher, Jr., Central; George H. Messick, Jr., Clemson; Charles K. Roby, Clemson; Cecil O. Huey, Jr., Clemson, all of S.C.

[73] Assignee: Tungsten Industries, Inc., Greer, S.C.

[21] Appl. No.: 556,157

[22] Filed: Nov. 29, 1983

[51] Int. Cl.⁴ .............................................. B24B 1/00
[52] U.S. Cl. .................. 51/288; 51/48 HE; 51/165.72; 364/474
[58] Field of Search ......... 51/165.71, 165.72, 165 TP, 51/48 HE, 288; 364/474

[56] References Cited

U.S. PATENT DOCUMENTS

| | | | |
|---|---|---|---|
| 3,851,563 | 12/1974 | Habib | 51/48 HE |
| 4,064,657 | 12/1977 | Habib | 51/48 HE |
| 4,115,956 | 9/1978 | Huffman | 51/165.71 |
| 4,136,390 | 1/1979 | Farrell | 51/165.71 |
| 4,163,345 | 8/1979 | Meili | 51/48 HE |
| 4,461,121 | 7/1984 | Motzer | 51/165.71 |

*Primary Examiner*—Harold D. Whitehead
*Attorney, Agent, or Firm*—Bailey & Hardaway

[57] ABSTRACT

Disclosed is a process which produces precision ground articles such as tungsten carbide burs without the use of skilled craftsmen. An automatic apparatus is described which is capable of performing the motions necessary to produce a machined given object and includes a control system for automated bur grinding. The process also converts geometric bur definitions into instructions that will produce the proper actions by the automated grinding.

5 Claims, 9 Drawing Figures

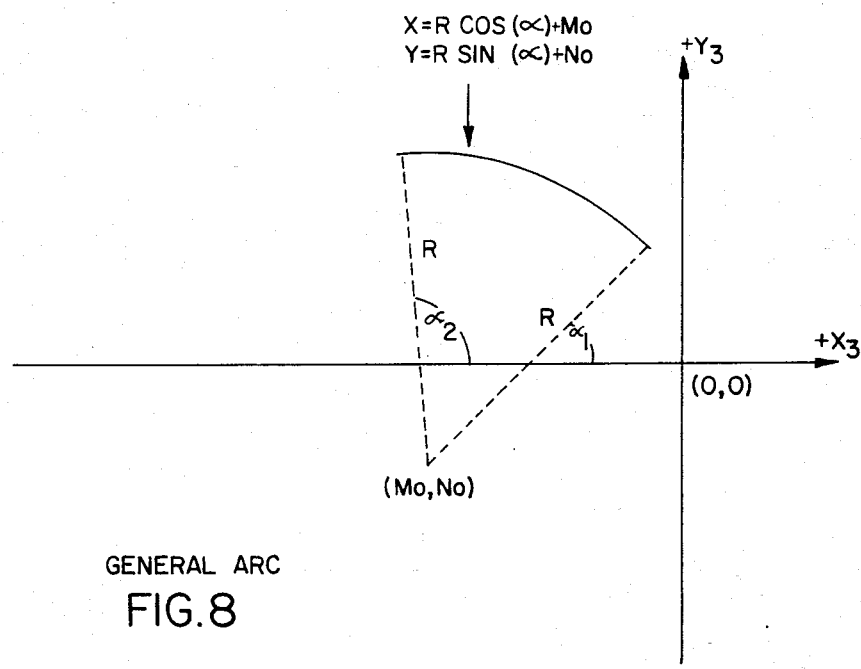
GENERAL ARC
FIG. 8
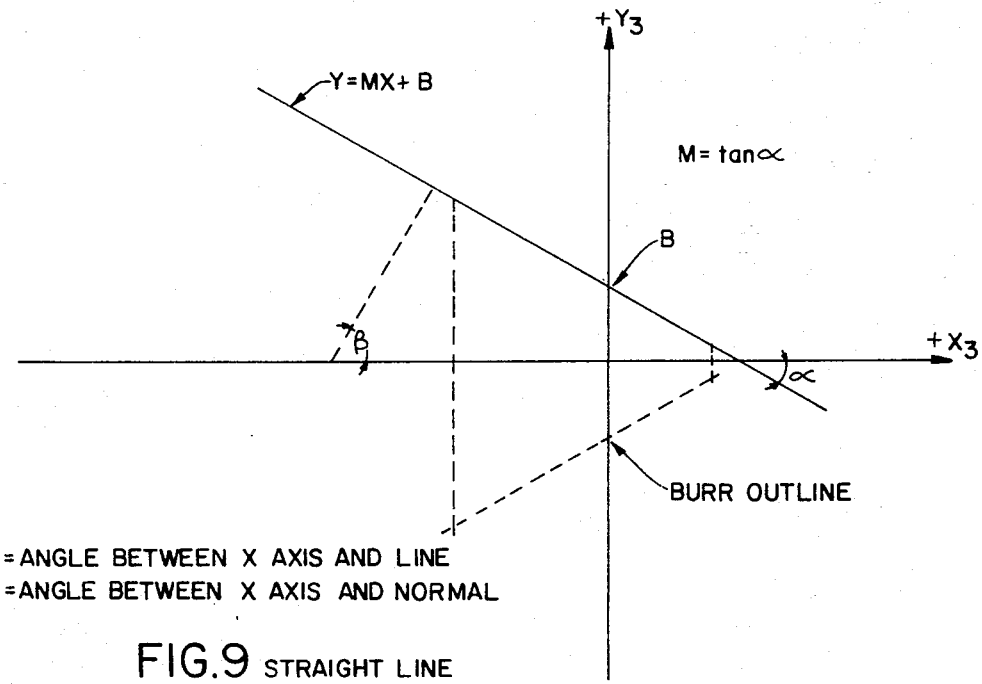
$\alpha$ = ANGLE BETWEEN X AXIS AND LINE
$\beta$ = ANGLE BETWEEN X AXIS AND NORMAL
FIG. 9 STRAIGHT LINE

AUTOMATED MACHINING METHOD

BACKGROUND OF THE INVENTION

This invention relates generally to the art of grinding and more particularly to a process and apparatus for automatically and reproducibly grinding a desired configuration from a elongated blank.

In the prior art various manual and some automatic techniques have been developed for the production of machined articles. Such machined articles are of various sizes and shapes and can be of the size of a turpine rotary down to the size of a denist drill of even smaller. For purposes of this disclosure the term "bur" is utilized as descriptive of the product produced by the prior art and of the machined article produced by the invention which is described below. However, the method and apparatus of this invention are applicable to all sizes of machined articles which are produced from elongated blanks.

A bur is a cutting or grinding tool. Small burs are commonly used in densitry as the major cutting tool for grinding or drilling teeth. Larger burs are used in a variety of manufacturing operations. Most of the time, the bur is used as a grinding tool for the removal of excess material after casting of machining processes. In general, the bur is used in a hand held operation. As a result, the precise shape of the bur is not usually critical. The bur is sometimes called a rotary file. For many years the bur has been manufactured from tool steel, but as the speed of the grinding tools has increased it has been recognized that tungsten carbide provides superior wear properties. Thus the demand for tungsten carbide tools has increased.

Blanks of cast tungsten carbide are ground with a metal based, diamond impregnated wheel to produce a bur with the desired shape and cutting characteristics. Burs are manufactured in a wide variety of sizes and shapes with special flute configurations for various applications. FIG. 1 illustrates some of the variety of shapes that are available for burs. Bur shapes are generally standardized. The normmal process for the production of tungsten carbide burs is for skilled craftsmen to use a diamond grinding wheel to hand grind the blanks into the desired shapes and flute patterns.

It is partially due to the number of different combinations of bur flute configurations that it has been difficult to utilize machines to replace the human craftsman in the bur manufacturing process. The use of skilled operators to produce burs leaves little opportunity for significant reductions in the cost of production. In addition, regardless of the skill of the operator, it has not been possible to precisely control the quality of the burs. In order to improve the productivity and quality of burs, several mechanical and computer controlled machines have been developed that are capable of partial automation. However, to date, the standard for comparison for the production of burs is the handmade bur.

Shapes of the burs have been sufficiently standardized that the American National Standards Institute (ANSI) has developed a set of standards for the "Blanks for Carbide Burs" (ANSI B94.13-1976) which defines the nominal dimensions and geometries of blanks that can be used in the production of tungsten carbide burs. These standards are hereby incorporated by reference.

SUMMARY OF THE INVENTION

It is thus an object of this invention to provide a novel method for grinding elongated blanks into desired configuration.

It is a further and more particular object of this invention to provide a method for the production of machined articles to produce such articles on a highly reproducibly and automated basis.

It is still a further and more particular object of this invention to provide machined articled produced from elongated blanks which are highly regular and reproducible to an extent not heretofore possible.

These as well as other objects are accomplished by utilizing an apparatus having a grinding wheel rotatable in a cutting direction and moveable along a rotary axis perpendicular to the axis of rotation together with a holder for an elongated blank and means for moving the blank along to rotary axis and at least two horizontal axes together with means for controlling and measuring movement along all axes. The process is carried out by controlling movement along all axes and measuring that movement in comparison with a predetermined set of measurements.

BRIEF DESCRIPTION OF THE DRAWINGS

FIGS. 8 and 9 illustrate geometrical relationships utilized in carrying out the process of this invention.

DETAILED DESCRIPTION

In accordance with this invention it has been found that the dimensions of the blanks set forth in the above referenced ANSI standards that all geometries of blanks can be described by a combination of arcs and/or straight lines. Even the most complicated bur geometry is defined by three arc segments. It is from these arc segments that control of the apparatus in the process of this invention is based.

Figure 1:
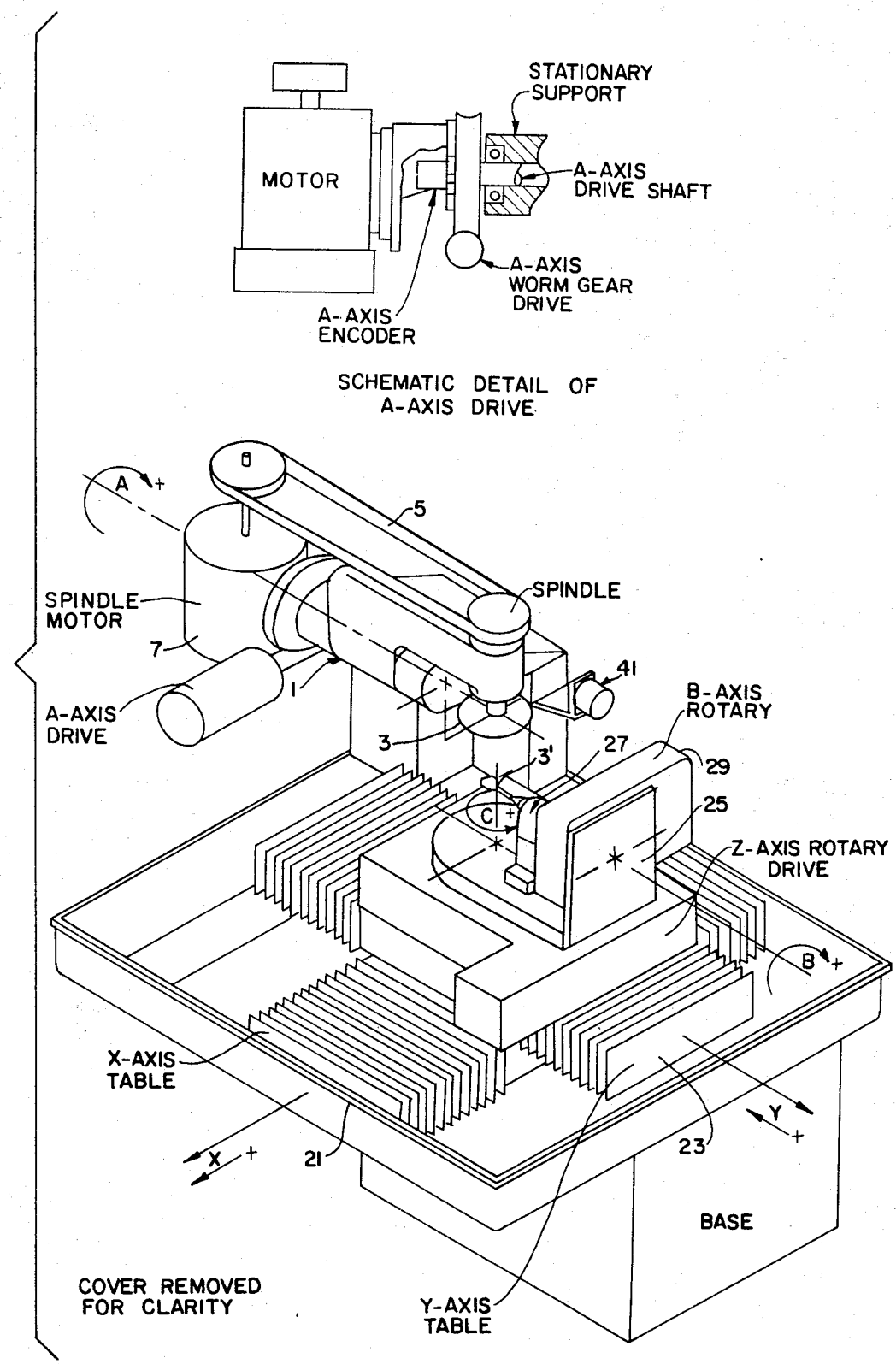
FIG. 1 of the drawings illustrates an apparatus for use in the process of this invention.

At the outset, it is best to develop an understanding of the preferred apparatus in accordance with this invention which is generally illustrated in FIG. 1 of the drawing.

The grinding head 1 comprises a hub mounted diameter grinding wheel 3, and a bearing system that allows the whole grinding head assembly to rotate about a line through the center of the grinding wheel (A axis). The grinding wheel is driven by a timing belt 5 and a 7.5 HP 3510 RPM motor 7 in order to maintain a grinding wheel speed of at least about 6000 RPM.

The apparatus of the invention is capable of performing all motions required for grinding the desired flutes in a bur. There are any number of physical configurations that would meet this criteria. However, a preferred and simple configuration of linear and rotary motions in the FIG. 1 embodiment which illustrates the major components of the bur grinding hardware that is used in the following discussions. The fundamental features of the apparatus are means for producing movement along two linear axes and three rotary axes.

Four of the five axes are stacked on top of each other. These four axes work together to control the motion of the tool that is being ground. At the bottom of the stack is the X axis table 21, which moves the tool across the surface of the wheel 3, in a direction that is perpendicular to the axis of rotation of the grinding head 1. Immediately above the X table 2 is a Y table 23, which produces motion that is perpendicular to the X axis. This motion results in a infeed to the grinding wheel 3. On top of the Y table is a rotary Z table 25 which rotates the tool holding work head 27 in a horizontal plane. Mounted vertically on top of the stack is the B axis movement means 29 which is used to rotate an alongated blank 31 about its central axis. The fifth axis, the A axis, is the rotation of the grinding head.

The control of the apparatus of this invention requires parameters as set forth below in order to reproducably produce precision machines article. The control system requires means for controlling all five axes simultaneously through a series of fine increments. The control system must also provide means for computing the data required to command the coordinated motions of the five axes. The control system must have a position feedback system that is directly linked to the motions of the five position feedback system that is directly linked to the motions of the five axes in order to provide true closed-loop position control. The ANOMATIC II Positioning Controller from the ANORAD Corporation is the preferred controller for providing the means set forth in this paragraph.

The preferred controller is a microprocessor based controller that uses a Motorola 6800 microprocessor assisted by an AMD9511 mathematics processor. The command structure for this controller is based in the Electronic Industries Associates (EIA) standard RS-273 and is similar to the command structure of many other computer numerical controllers. In addition to the standard machine control commands this invention comprises a set of mathematical operator commands that allow the controller to compute the part of one or more axes based on a equation.

There are two type of feedback signals that are used in the control of each axis. The motor-drivers on each axes are DC servo motors, known to the art. Each motor preferrably has integral tachometer feedback systems used for velocity control of the motor-drivers. In addition, each axis is equipped with an encoder that is used to directly measure the absolute location of the axis. The technique increases the accuracy of the axis positioning.

A direct measuring encoder is utilized on each axis for measurement. The purpose of the use of direct measurement is to eliminate the limitations that result from such mechanical interactions such as gear backlash and windup. Optical encoders are preferably used. For the X and Y axes, linear encoders were incorporated directly in the table design to provide a resolution of 0.0001 inch. For the Z, A, and B axes, rotary encoders were used with resolutions of 0.002, 0.015, and 0.006 degrees respectively. Due to hardware limitations and greater tolerence, the B axis utilizes an indirect measurement. This method is relatively easy to interface with because most of the industrial machine tool controllers manufactured today are designed to utilize the optical encoder. As an example optical encoders manufactured by Dynamics Research Corporation may be utilized with the invention.

The preferred optical encoder as utilized with this invention comprises a series of evenly spaced lines that are printed on a glass plate. A light shines through the glass plate onto a photodetector assembly. As the glass plate moves, the lines on the plate cast a shadow on the photodetector. Each time a shadow of a line crosses the photodetector an electronic pulse is produced as well as a signal that indicates the direction of motion. These signals are used by the control system to keep track of the exact location of the encoder and the axis.

One specific feature that is incorporated into the encoders as used with the invention is the identification of a machine home location. The machine home allows that controller to respond to a home command by returning each axis to a hardware dependent position that can not be altered by the software associated with the controller. This allows the registration of the hardware system relative to this location without the need of a manual coordinate location procedure.

The preferred apparatus of this invention is equipped with a precision touch probe 41 which sends the computer controller a signal whenever it is touched. This probe 41 is utilized for two major purposes, first to measure the exact distance from the center of rotation of the Z axis to the end of the blank 31 and secondly, to verify the calibration of the home system since the probe is located at a known fixed location. The probe may also be used for quality control measurements and automatic registration and flute tracking for applications such as bur resharpening.

Elongated machined articles such as burs are classified for the purposes of defining the blanks used in the manufacture of burs as well as for basic cataloging and communications purposes. Tungsten carbide bur blank geometries are defined by ANSI standard B94.13-1976. The bur profiles are all defined in terms of arc and straight line segments.

Figure 2:
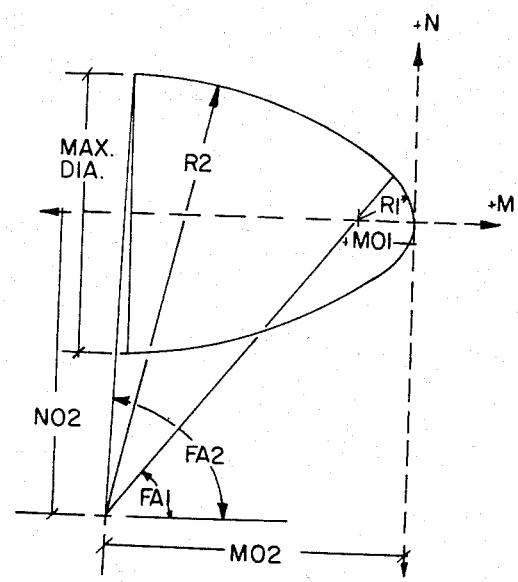
FIG. 2 of the drawings illustrates a bur blank geometry to be produced by the process of this invention.

In order to utilize the information in ANSI standard B94.13-1976, a coordinate system was created and superimposed on the profile definitions. FIG. 2 is an example of the tungsten carbide bur blank geometry definitions provided in the ANSI standard. The coordinate system is defined such that the axis of rotation of the bur is the ordinate with the positive direction defined by the vector from the base to the nose of the blank. The abscissa is normal to the center line of the blank. The origin is defined by the nose of the bur. FIG. 2 is an example of the bur geometry in a rectangular coordinate system (M-ordinate, N-abscissa). This system is simple to relate to the data in ANSI B94.13-1976 and simplifies the data input to the computer programs.

In order to utilize the information in ANSI standard B94.13-1976, a coordinate system was created and superimposed on the profile definitions. FIG. 2 is an example of the tungsten carbide bur blank geometry definitions provided in the ANSI standard. The coordinate system is defined such that the axis of rotation of the bur is the ordinate with the positive direction defined by the vector from the base to the nose of the blank. The abscissa is normal to the center line of the blank. The origin is defined by the nose of the bur. FIG. 2 is an example of the bur geometry in a rectangular coordinate system (M-ordinate, N-abscissa). This system is simple to relate to the data in ANSI B94.13-1976 and simplifies the data input to the computer programs.

The depth in which the grinding wheel must plunge into a bur blank is a function of the number of flutes to be ground into the blank and the current radius. By varing the flute depth, the bur profile can be maintained. The equation used follows:

Depth of Cut = N × sin (360/F) × cos (A) × tan (G)

where
N = current radius of bur
F = number of flutes
A = flute angle
G = bevel angle of grinding wheel The profile geometry of the bur can be used to define the motions of the X, Y, and Z axes of the bur grinding machine, but there are several factors that complicate the definition of the A and B axis motion. These factors are based on the operational requirements of the end product bur so it is necessary to discuss the flute parameters of the various bur types.

The number of flutes per bur is based on the desired application of the bur. The variables are the maximum bur diameter and the type of "cut" (i.e. standard, fine, course, and alumacut). While the diameter defines the size of bur to be ground, the factors needed for each type of "cut" are derived from a linear regression analysis of the standard number of flutes used in hand grinding. The regression analysis is based on the premise that the end result must yield a number of flutes that are a multiple of four. The following is the resulting equation with its set of support constants:

number of flutes = 4 × ROUND (((C × $D_m$) + B)/2)

where:
$D_m$ = max. diameter
ROUND means roundoff to nearest integer
for standard cut use:
B = 4.46
C = 15.35
for fine cut use:
B = 5.50
C = 18.60
for course cut use:
B = 3.50
C = 13.14
for alumacut use:
B = 1.74
C = 4.28

Lead Angle vs. Bur Profile—The flute angle (defined as the angle between the centerline of the bur and the projection of the vector parallel to the flute on the plane of the bur center line) is specified as a single number, at the maximum diameter of the bur. However, the flute angle actually may vary at different parts of the bur based on manufacturing and bur effectiveness considerations. From a practical point of view, it is desirable to define the flute angle in the simplist mathematical terms that are consistant with an effective finished bur.

Constant Lead—The simplest method of handling the flute angle definition is to consider the lead of the flute. That is the axial distance the flute travels during one revolution. By defining the lead as a constant at the maximum tool diameter, the flute angle will vary based on the diameter of the bur. The advantage of this methodology is that as the diameter decreases, so does the flute angle which increases the cutting effectiveness of the flutes at the nose of the bur. This results in the flute angle being 0° at the nose of the bur. The problem with this method occurs when a bur has a reverse taper. As the diameter of the bur gets smaller, the grinding wheel angle also gets smaller. This results in machine interference problem. Therefore the constant lead approach is limited to the section of the bur between the nose and the maximum diameter.

The equations used to produce the constant lead are as follows:

$A_{axis} = -(H \times N)/(D_m/2)$ where
H = maximum flute angle
N = current radius of bur
$D_m$ = maximum diameter of bur $B_{axis} = (180 \times M)/((P \times D_x \times \cos(H))/2)$ where
M = length from current position to nose
P = (3.14159)

Constant Angle—An alternative treatment is to define the flute angle as a constant. This is valid when the diameter of the bur does not change significantly. However at the nose of a spherical end bur, this method reduces the cutting effectiveness of the flutes. This is because as the diameter gets smaller, the bur must rotate faster and the flute spacing decreases. As a result, the prefered method that has been adopted is to require a constant flute angle for the portion of a bur from the maximum diameter to the base of the bur (i.e. the back side of the bur).

Figure 3:
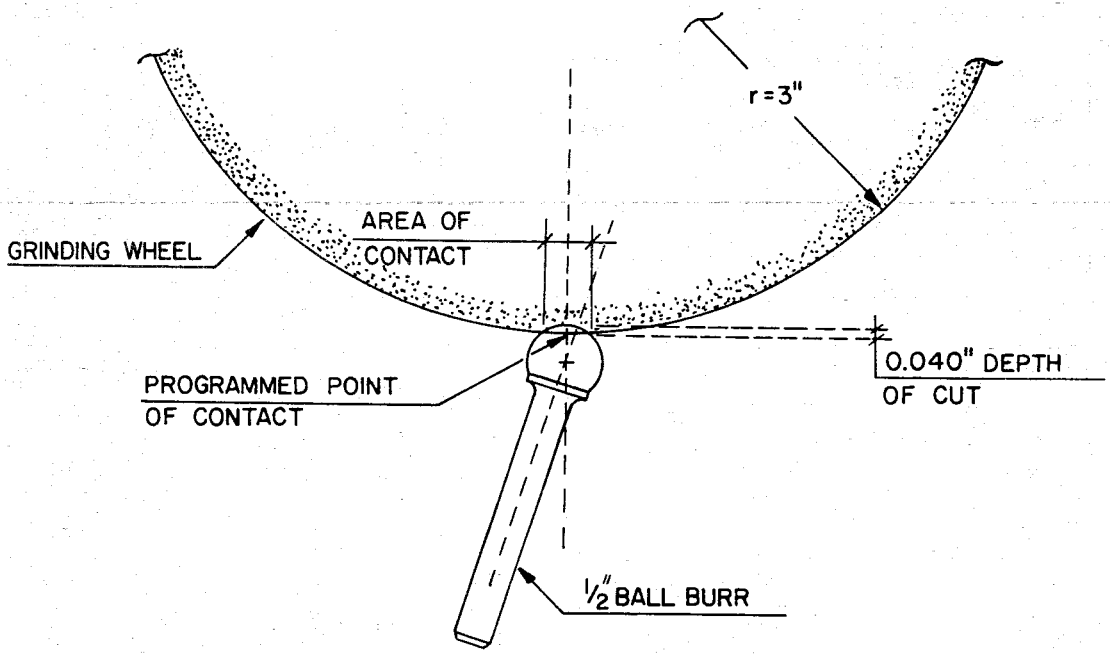
FIG. 3 of the drawings illustrates the relationship between a blank and grinding wheel in carrying out the process of this invention.

The equations used to produce the constant grinding wheel angle are as follows:

$A_{axis} = -H$ $B_{axis} = B_1 + dB$ where
$B_1$ = last B position
$dB = (dM \times \tan(H))/N$
dM = change in length along bur Special End Considerations—Although the general methodology for the flute angle on the nose end of a bur is to define a constant lead, there are some special considerations at the end of the bur. The difficulty is that the grinding wheel is not a point grinding device, but rather a line cutting device. FIG. 3 illustrates the problem. The grinding wheel has a diameter of approximately six inches, and removes any material it contacts. It is necessary to account for this line cutting effect in order to prevent the grinding wheel from overcutting the end of the bur.

Due to the need for the full bur profile to cut and/or grind effectively, special considerations must be given to the nose of a bur. This is because as the diameter of a bur gets smaller, so too does the depth of the flutes, until at the very end of a bur, the depth is zero. However, if all of the flutes were ground artifically deep at the nose in an attempt to get an effective nose, the nose profile would be destroyed without the flutes getting deeper. This is because of the flute overlap that would result. To solve this problem, several flute types are defined (end cutting, semi end cutting, and non end cutting).

Spherical end burs have a partial sphere at the nose with the starting angle of the first arc equal to zero degrees. There are only two opposed flutes of this style per spherical ended bur. These flutes are ground to 75% of the maximum flute depth at the nose. The artificial depth is blended from 100% starting at the maximum diameter. This is achieved by adding a depth factor to the normal depth of cut. The following equation is used to derive ths factor:

$$\text{depth factor} = (0.25 \times (A_f - A_c))/(A_f - A_s)$$

where
- $A_f$ = finishing angle of first arc or 90 degree point
- $A_c$ = current angle on bur
- $A_s$ = starting angle of first arc However, if these two flutes were to start straight on the nose, the nose would still be ground away. It is therefore necessary to offset the starting point of the flute so that the grinding wheel runouts will meet at the center. This is done by modifying the starting angle of the first flute with the following equation:

$$S = ((D_w/2) + R_d)^2 + R^2 - (D_w^2/4))/(2 \times R \times ((D_w/2) + R_d))$$

where
- S = new starting angle for first arc
- $D_w$ = diameter of grinding wheel
- R = radius of first arc on bur profile
- $R_d$ = radius of first arc less depth of cut at nose This modification of the starting angle causes another problem. Since the flute is starting at a point on the bur that has some diameter, the constant lead equations yield a non zero angle of the grinding wheel. This angle of the grinding wheel changes the runout resulting in the two end cutting flutes not meeting at the center. To correct this problem, the grinding wheel (A axis) is forced to remain at zero degrees at the starting point. It is then blended into the normal flute angle, finishing at the point of maximum flute angle. This is done by calculating and then substracting a linear correction factor from the value produced by the constant lead equations. The equation is as follows:

$$\text{linear correction factor} = (A_i \times (A_f - A_c))/(A_f - A_s)$$

where
- $A_i$ = precalculated initial grinding wheel angle
- $A_f$ = finishing angle of first arc or 90 degree point
- $A_c$ = current angle on bur
- $A_s$ = new starting angle of first arc Semi end cutting flutes are shifted 90 degrees from the end cutting flutes. They are basically the same as the end cutting flutes except the start slightly farther away from the nose. While the end cutting flutes meet at the center, the semi-end cutting flutes stop before the center.

Non end cutting flutes fill the spaces of the four remaining quadrants. The depth of the these flutes are not modified and are based strictly on the bur diameter. However, the modification of the constant lead for the end and semi-end cutting flutes force the non-end cutting flutes to do the same. The grinding wheel is forced to remain at zero degrees, from the normal beginning of the flute until the flute has reached the same point as the starting point for the end cutting flutes. Then the flute will track the same as a end cutting flute.

Pointed end burs do not have a spherical nose. Therefore only two types of flutes are required (end cutting and non end cutting).

With pointed end burs, there are four end cutting flutes located 90 degrees apart. The modified flute depth and constant lead techniques remain the same as above. However, the modified starting angle is eliminated. This is because the nose of the bur is a point and the grinding wheel runout is out of the envelope of the bur.

Non-end cutting flutes follow the same path as the end cutting flutes except without the forced depth of cut.

Flat end burs have a flat nose and only require one type of flute. All flute depths and angles are based on the constant lead equations. This is because flat end burs have the same properties of a pointed bur without the nose having a small diameter to give problems.

Secondary flutes use the same basic equations as the non end cutting flutes but have a modified reverse flute angle. These flutes start at the same location as the end cutting flutes for the spherical and flat end burs. Starting locations for secondary flutes of pointed burs are shifted down the bur.

MATHEMATICS

From a mathematical point of view there are two coordinate systems of interest. The first is the coordinate system of the machine. The second is the coordinate system of the bur. By defining the motion of the grinding wheel in the coordinate system of the linear tables (the $X_0 - Y_0$ axis) and the angle of the Z axis so that the surface of the bur is located at the edge of the grinding wheel, the desired bur contour is obtained. Using this approach, the profile of the bur can be defined in the bur coordinate system. The bur coordinates are then translated to direct the motion of the X, Y, and Z axes resulting in the proper profile. This is accomplished by defining the necessary transformation matrices to convert the bur coordinate data into the machine coordinate system.

In order to appreciate the efficient use of the coordinate transformation it is useful to consider the the grinding operation. The grinding wheel should be positioned such that the velocity vector of the motion of the wheel is tangent to the surface of the bur. This requirement is equivalent to the requirement that the normal vector to the surface of the grinding wheel and the normal vector to the surface of the part are continuous and form a straight line. The normal to the surface of the grinding wheel is the radius from the center of the grinding wheel and the point of contact. In the bur coordinate system, the normal to the surface of the bur can be computed and expressed as an angle Z. The definition of the normal angle Z is the angle from the X axis and the vector that is normal to the surface as measured in a clockwise direction. So in order to insure that the wheel is in proper contact with the bur it is sufficient to require the bur blank to be positioned such that the normal to the surface of the bur passes through the point of contact and the center of the grinding wheel. This condition can be satisfied easily by requiring the angle of the Z axis be set at an angle $-Z$, where Z is the angle between the X axis and the normal to the surface in the bur coordinate system. The relationship between the grinding wheel and the bur are illustrated in FIG. 3.

Figure 4:
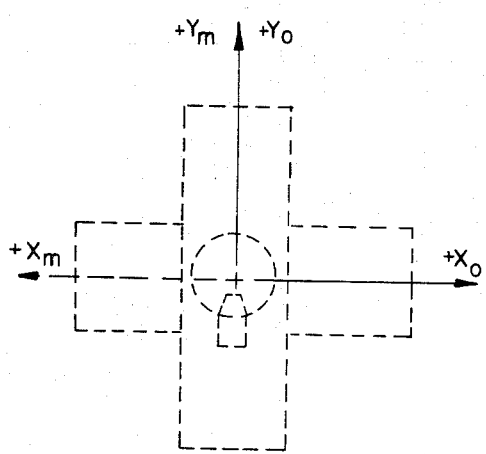
FIGS. 4, 5, 6, and 7 illustrate coordinate systems imposed upon blank geometries in carrying out the process of this invention.
Figure 5:
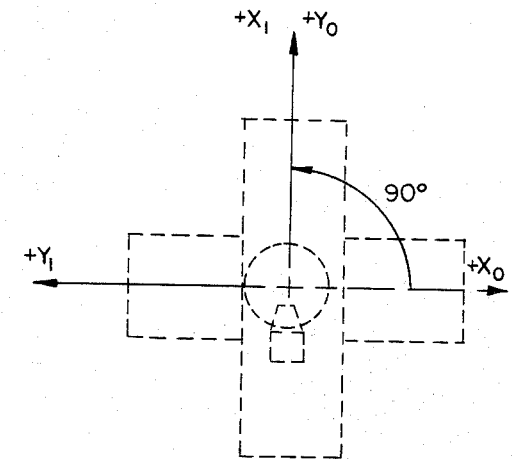

In order to keep each step of the coordinate transformation in a form that is easy to follow, the transformation matrix will be developed as a series of simple transformations that can be performed sequentially. The initial coordinate frame is a conventional coordinate system with its origin located at the center of the Z axis (see FIG. 4). The first transformation is the rotation of the initial coordinate system ($X_0, Y_0$) by 90° in a clockwise direction (see FIG. 5) to frame $X_1, Y_1$.

$$A_1 = \begin{bmatrix} \cos(90°) & -\sin(90°) & 0 \\ \sin(90°) & \cos(90°) & 0 \\ 0 & 0 & 1 \end{bmatrix} = \begin{bmatrix} 0 & -1 & 0 \\ 1 & 0 & 0 \\ 0 & 0 & 1 \end{bmatrix}$$

Figure 6:
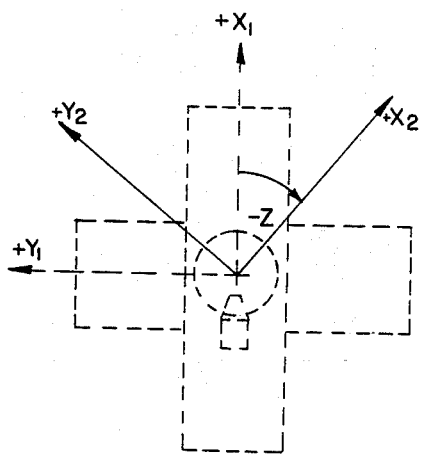

The second transformation is the rotation of the coordinate system by an angle $-Z$ to frame $X_2, Y_2$. This is performed as a seperate transformation in order to express the transformation in terms of the angle Z (see FIG. 6).

$$A_2 = \begin{bmatrix} \cos(-Z) & -\sin(-Z) & 0 \\ \sin(-Z) & \cos(-Z) & 0 \\ 0 & 0 & 1 \end{bmatrix}$$

Figure 7:
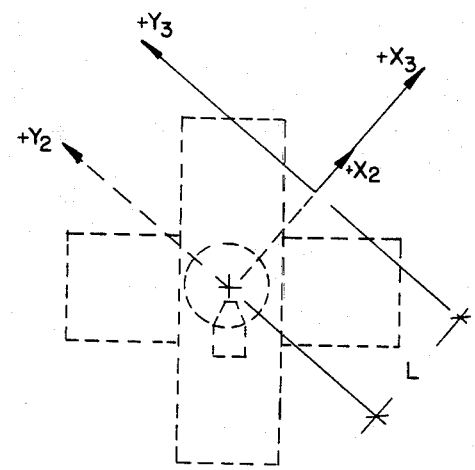

The final transformation is the translation by a distance L along the $X_2$ axis to frame $X_3, Y_3$ (see FIG. 7).

$$A_3 = \begin{bmatrix} 1 & 0 & L \\ 0 & 1 & 0 \\ 0 & 0 & 1 \end{bmatrix}$$

The total transformation matrix is the product of the three individual transformation matrices.

$$T = A_1 A_2 A_3$$

$$T = \begin{bmatrix} 0 & -1 & 0 \\ 1 & 0 & 0 \\ 0 & 0 & 1 \end{bmatrix} * \begin{bmatrix} \cos(-Z) & -\sin(-Z) & 0 \\ \sin(-Z) & \cos(-Z) & 0 \\ 0 & 0 & 1 \end{bmatrix} * \begin{bmatrix} 1 & 0 & L \\ 0 & 1 & 0 \\ 0 & 0 & 1 \end{bmatrix}$$

$$T = \begin{bmatrix} -\sin(-Z) & -\cos(-Z) & -L\sin(-Z) \\ \cos(-Z) & -\sin(-Z) & L\cos(-Z) \\ 0 & 0 & 1 \end{bmatrix}$$

The transformation matrix T must now be converted to a left-hand system, (ie. the X-axis definitions for the + and − directions were reversed by the controller manufacturer).

$$T = (-1\ 1\ 1) \begin{bmatrix} -\sin(-Z) & -\cos(-Z) & -L\sin(-Z) \\ \cos(-Z) & -\sin(-Z) & L\cos(-Z) \\ 0 & 0 & 1 \end{bmatrix}$$

$$T = \begin{bmatrix} \sin(-Z) & \cos(-Z) & L\sin(-Z) \\ \cos(-Z) & -\sin(-Z) & L\cos(-Z) \\ 0 & 0 & 1 \end{bmatrix}$$

This transformation is located of the center of the Z axis. However, since it would be convenient to locate the machine coordinate system at the point of contact between the bur and the grinding wheel, the X and Y components must be mirrored.

$$T = (-1\ -1\ 1) \begin{bmatrix} \sin(-Z) & \cos(-Z) & L\sin(-Z) \\ \cos(-Z) & -\sin(-Z) & L\cos(-Z) \\ 0 & 0 & 1 \end{bmatrix}$$

$$T = \begin{bmatrix} -\sin(-Z) & -\cos(-Z) & -L\sin(-Z) \\ -\cos(-Z) & \sin(-Z) & -L\cos(-Z) \\ 0 & 0 & 1 \end{bmatrix}$$

The transformation matrix T can now be used to convert position and vector data from the bur coordinate system to the machine coordinate system.

$$P_{machine} = T P_{bur}$$

All of the burs that are defined by ANSI standard B94.13-1976 can be described by a conbination of straight line and arc segments. Therefore, these two line segments will be defined in general terms independently.

As illustrated in FIG. 8, the profile of the bur can be defined in the bur coordinate system. In the case that the bur profile consists of an arc (part of a circle), the equation for the circle is $$(x - M_o)^2 + (y - N_o)^2 = R^2.$$

Where $M_o$ and $N_o$ define the location of the center of the circle, and R is the radius of the circle. The values of x and y can be expressed in terms of the radius (R), the angle between the X-axis and the radius vector, and the location of the center of the circle ($M_o$ and $N_o$) by the equations:

$$x = R \cos(a) + M_o$$

$$y = R \sin(\&a) + N_o$$

However, based on the machine coordinate system and the grinding methodology, the radius vector will be on the Y-axis with the grinding wheel and the bur in contact at the surface of the bur. Therefore, the Z-axis will be set at an angle that is numerically equal to the angle & (Z = a).

$$P_{bur} = \begin{bmatrix} x \\ y \\ 1 \end{bmatrix} = \begin{bmatrix} R\cos(Z) + M_o \\ R\sin(Z) + N_o \\ 1 \end{bmatrix}$$

Converting from the bur to the machine coordinate system;

$$P_{machine} = \begin{bmatrix} -\sin(-Z) & -\cos(-Z) & -L\sin(-Z) \\ -\cos(-Z) & \sin(-Z) & -L\cos(-Z) \\ 0 & 0 & 1 \end{bmatrix} \begin{bmatrix} R\cos(Z) + M_o \\ R\sin(Z) + N_o \\ 1 \end{bmatrix}$$

The resulting equations of the arc in the machine coordinate system are;

$$x = -\sin(-Z)[R\cos(Z) + M_o] - \cos(-Z)[R\sin(Z) + N_o] - L\sin(-Z)$$

$$y = -\cos(-Z)[R\cos(Z) + M_o] + \sin(-Z)[R\sin(Z) + N_o] - L\cos(-Z)$$

Using trigonometric identities and simplification the equations for grinding a straight line in the machine coordinate system reduce to;

$$x = -[M_o\sin(-Z) + N_o\cos(-Z) + L\sin(-Z)]$$

$$y = -[R + M_o\cos(-Z) - N_o\sin(-Z) + L\cos(-Z)]$$

Using these equations, the contour can be programmed to use the definition of the arc in the bur coordinate system in terms of R (radius), $M_o$, $N_o$ (x and y values for the center)

$Z_o$, and $Z_1$ (the start and stop values of the angle subtended by the arc).

In this manner, the motions of the X, Y, and Z equations of motion for grinding a general arc in the machine coordinate system are defined by these five parameters in the bur coordinate system.

As illustrated in FIG. 9, part of a bur profile may be defined by segments of straight lines. The general equation for a line is;

$$n = \text{slope} \times m + B$$

Where n is used for the y value in the bur coordinate system and m is used for the x value in the bur coordinate system. This replacement is for the sole purpose of distinguishing between values in the bur and machine coordinate systems. Slope is the slope of the line (ie. slope=tan(a) where a is the angle between the M-axis and the line) and B is the N intercept in the bur coordinate system. The equation for the line in the bur coordinate system can be written as;

$$n = m \tan(a) + B$$

The angle between the M-axis and the normal to the line is b (where b=a=90°). Because of the grinding methodology, the angle b is equal to Z (the angle of the Z-axis in the machine coordinate system). As a result, $$n = m \tan(b + 90°) + B$$

or $$n = m \tan(Z + 90°) + B$$

By applying trigonometric identities;

$$n = m \cot(-Z) + B$$

As a result, the position vector in the bur coordinate system is $$bur = \begin{bmatrix} x \\ y \\ 1 \end{bmatrix} = \begin{bmatrix} m \\ m \cot(-Z) + B \\ 1 \end{bmatrix}$$

This vector can be transformed into the machine coordinate system.

$$P_{machine} =$$

$$\begin{bmatrix} -\sin(-Z) & -\cos(-Z) & -L\sin(-Z) \\ -\cos(-Z) & \sin(-Z) & -L\cos(-Z) \\ 0 & 0 & 1 \end{bmatrix} \begin{bmatrix} m \\ m\cot(-Z) + B \\ 1 \end{bmatrix}$$

$$P_{machine} =$$

-continued $$\begin{bmatrix} m(-\sin(-Z) - \cos(-Z)\cot(-Z)) + L\sin(-Z) + B\cos(-Z) \\ m(-\cos(-Z) + \sin(-Z)\cot(-Z)) - L\cos(-Z) + B\sin(-Z) \\ 1 \end{bmatrix}$$

Using trigonometric identities and simplification the equations for grinding a straight line in the machine coordinate system reduce to;

$$P_{machine} = \begin{bmatrix} x \\ y \\ 1 \end{bmatrix} = \begin{bmatrix} [m/\sin(-Z)] + B\cos(-Z) + L\sin(-Z) \\ B\sin(-Z) - L\cos(-Z) \\ 1 \end{bmatrix}$$

Upon examination of these equations it is observed that the Z axis is set based upon the slope of the line in the bur coordinate system, the Y axis is set at a constant value for the line, and the X-axis is the only axis that is moved to produce any profile (defined by a straight line).

As part of the development of the control difinition in previous sections, the characteristics of the apparatus of this invention are used as an integral part of the explanations and examples. It should be noted that the process of this invention is not limited to the particular apparatus used in the description which follows. In the following paragraphs the process will be described in terms of the computer programs for the ANORAD ANOMATIC II and the program generator program on the SUPERBRAIN II will be discussed. The examples will not include details from supporting documents (such as the ANOMATIC II PROGRAMMING MANUAL, the PASCAL-Z Programming Manual, or the SUPERBRAIN II Owner's Manual) which are known to the art. The following discussion will be limited to a presentation of examples of the programs necessary to implement the process and an explanation of specific features of this invention.

The ANOMATIC II controller is an integrated commercially available computer numerical control system. This controller provides closed loop control for analog systems through the use of a microcomputer system. The characteristic of this controller that made it suitable for this invention is the addition of a mathematics processor chip that allows the controller to make mathematical calculations simply and rapidly.

Access to the mathematics capabilities of the ANOMATIC II is provided through extensions to the EIA RS-273 command structure. The specific extensions are;

| SYMBOL | OPERATION | SYMBOL | OPERATION |
|---|---|---|---|
| + | Plus | ** | Exponentiate |
| − | Minus | J | Jump |
| * | Multiply | Q4 | Cos & |
| / | Divide | Q5 | Tan & |
| ( | Open Parenthesis | Q6 | ARC Sin |
| ) | Close Parenthesis | Q7 | ARC Cos |
| A | Absolute | Q8 | ARC Tan |
| P | pi(3.1416) | Q9 | Common Log |
| R | Square Root | Q10 | Natural Log |
| S | Sin in Radians | Q11 | Natural Exponent |
| T | Truncate | | |

EXAMPLE PROGRAM

For the purposes of example, a ⅝ inch diameter egg bur (ANSI type SE bur) will be used. The EDP part number of 440625 defines the bur profile and by selecting the type of cut, the type of grind and the shank diameter the complete bur can be defined. The complete EDP number for the ⅝ inch SE bur with standard flute spacing and a double cut grind on a ¼ inch shank is 440625110. The complete ANOMATIC II program to make the 440625110 bur is listed in Appendix D. A brief review of Appendix D will reveal that the ANORAD program is complex, and that there are a larger number of operations that must be performed by the controller in addition to the calculation of data values (expressed in the ANOMATIC II programming language) as described in the ANOMATIC II Operating and Programming Instruction Manual. It is the complexity of the ANORAD programs that makes it even more desirable to use automated methods to generate the programs. Even though the programs can be generated by "hand" even the slightest error is evident in the final product, and humans sometimes make mistakes.

AUTOMATIC PROGRAM GENERATION

The method used for the automatic generation of ANORAD programs is to define "generic controller programs" which can be used to make a family of bur shapes by changing specific parameters in the program, and using a computer program to calculate the values of these parameters and write the complete program. A complete listing of a "Generic ANORAD Program" is given is Appendix F. This proceedure eliminated the danger of mathematical and transcriptional errors by human operators.

The program generation logic is illustrated in the Flow Sheet in Appendix E. A complete listing of the PASCAL source code for the program generation is given in Appendix G, and the supporting data files are listed in Appendices B, and C.

IMPLICATIONS FOR USE ON OTHER MACHINES

The final result of the application of the concepts resulted in an efficient, reliable, simple to program system for the production of burs. The concepts presented in this report can be utilized with other controllers and other hardware systems. There are also many other applications where the concept can be used to control sophisticated machines and obtain a degree of efficiency that can not be obtained by direct programming.

There are actually two computers that are used to make a desired bur. The part programming is performed on an Intertec Data Systems Superbrain II which produces ready-to-run programs for the Anorad Anomatic II controller. With this combination, it is possible to program a bur and be ready to manufacture that bur in less than ten minutes.

A Superbrain II is used for the purposes of part programming. This microcomputer is prefered for three basic reasons. First, the Superbrain II is a complete system that contains 2 Z80 microprocessors, 64K bytes of random address memory, 2 floppy disk drives, a complete ASCII keyboard, a CRT display, and a good implimentation of the RS-232C communications port. Second, the Superbrain II has a CP/M 2.2 operating system, so that software can be used on other microcomputers with the same operating system.

In order to support inventory control and billing, a 9-digit numbering system that is capable of uniquely identifying most of the parts is utilized. This EDP (Electronic Data Processing) numbering system has specific meanings associated with three major groups of digits in the EDP number.

The basic form of the EDP number for burs is:

| Series NN SERIES | Decimal Size NNNN | Cut N | Grind N | Shank N |
|---|---|---|---|---|
| Series Numbers | ANSI Identifier | Description | | |
| 40 | SB | Cylindrical end cutting | | |
| 41 | SA | Cylindrical NO end cut | | |
| 42 | SC | Cylindrical radius end | | |
| 43 | SD | Ball | | |
| 44 | SE | Egg | | |
| 45 | SF | Tree radius end | | |
| 46 | SG | Tree pointed end | | |
| 47 | SH | Flame shape | | |
| 48 | SL | Cone radius end | | |
| 49 | SM | Cone pointed end | | |
| 50 | SN | Inverted Cone | | |
| 51 | SJ | Cone 60° taper | | |
| 52 | SK | Cone 90° taper | | |
| 53 | GTS | Internal Grinding Tool | | |

DECIMAL size is equivalent to the maximum cutting diameter of bur.

DECIMAL size is equivalent to the maximum cutting diameter of bur.

| CUT* | |
|---|---|
| 1 | Medium standard cut |
| 2 | Fine cut |
| 3 | Coarse cut |
| 4 | Aluma cut |
| GRIND* | |
| 0 | Right hand spiral only |
| 1 | Double cut |
| 2 | Diamo cut |
| 3 | Diamond cut |
| 4 | Chipbreaker cut |
| SHANK* | |
| 0 | ¼ inch diameter |
| 1 | ⅛ inch diameter |
| 2 | ⅜ inch diameter |
| 3 | 3 mm diameter |
| 4 | 6 mm diameter |
| 5 | 8 mm diameter |
| 6 | 10 mm diameter |
| 7 | 3/16 inch diameter |
| 8 | ½ inch diameter |
| EXAMPLE: | |
| SA1 standard cut ¼ shank | 410250100 |
| SA9 double cut ⅜ shank | 411000112 |
| SC5 coarse diamo cut ¼ shank | 420500320 |
| SL6 fine diamond cut ⅜ shank | 480375232 |

*do not apply to GTS - GTS tools are identified by series and size only.

EXAMPLE: GTS ¼-530250000

The parameters for the burs defined by this computer assisted production process is based on bur blank data provided in the American National Standard Institute (ANSI) standard B94.13-1976. When possible, geometric definitions similiar to the ANSI standard are used. However, slight modifications to the coordicate system have been made to standardize and simplify the automation process.

Each of the thirteen types of burs that are included in the automatic program generation system have a number of geometric and descriptive parameters that must be entered in to the program either at the time of operation or from an existing data set. The specific definitions for the parameters vary slightly between the various bur shapes. Appendix A contains a complete set of the programming work sheets.

Starting Program

1. TURN ON SUPERBRAIN
2. LOAD BUR OPERATIONS DISK IN A: DRIVE
3. LOAD DATA DISK IN B: DRIVE
4. RUN "BURR" PROGRAM—With display indicating A½ type "BURR" and RETURN (key).

Program Operations

SIGN ON MESSAGE—Immediately after the BURR program begins operation, the computer screen wil clear and a message will appear on the screen which will require no operator input. Although it is recognized that the experienced operator will not read these messages every time the program is used, the messages will be useful to the novice or infrequent operator. An example of the sign-on message is provided later in section C as part of a programming session example.

Entering EDP Numbers

Normal EDP Numbers—Type the desired nine (9) digit EDP Number and RETURN. There are two methods of correcting errors in the EDP number before the RETURN key is used. First, the BACKSPACE key will erase and back over one character for each stroke. Second, the DELETE key will erase and echo the character that was erased. Either of these methods is acceptable, however the BACKSPACE is usually less confusing.

Error Messages—In order to make the operation of the program simpler, the computer program makes a number of checks that will identify errors and allow the operator to correct them. The following are the error messages that will be encountered most often during normal programming, opertions.

"ERROR—invalid entry"

Input was not a nine character part number or one of the three valid functions (EDIT, LIST, or QUIT). "EDP number was not found"

This message indicated that the number was of the proper form but there was no data in the data base that corresponded to that number. If the EDP number was not an error then the function EDIT can be used to add the proper data to the data base.

Special EDP Numbers—One of the catagories of EDP numbers is the SPECIAL which is designated with the letter "S" as the second character in the EDP number. The special EDP part data, which is stored in the data file in the same manner as any other part number, is operator defined and need not be related to physical parameters. If the data for the special EDP number entered is in the data file "BURRBLOK" the program will operate normally. However, if there are no data in the datafile "BURRBLOK" that corresponds to the special EDP number, the program will respond with the question:

"EDP number was not found

Is this part a new special case? (Y/N)"

A response of "N" and RETURN will restart the programming process. A response of "Y" and RETURN will automatically call the function EDIT which will allow the generation of the special bur program and the option of saving the data for future use.

Parameter Verification—When a proper EDP number is entered, the screen will display the EDP number, bur description, and a complete list of the parameters that describe the bur. At this point the operator has the option of generating the complete program or if there is some error in the EDP number or the part parameters to abort the operation. If the EDP number and the parameters are correct, enter a "Y" and RETURN. Otherwise enter "N" and RETURN to restart the programming process.

Part Program Generation—When a proper EDP number is entered and the data is accepted by entering a "Y" and RETURN, the part program will automatically be generated and stored on disk B: and the following message will be displayed. "The EDP number B:xxxxxx.xxx ANORAD file has been generated and stored."

ERROR messages at this point indicate that the data contained an error. These errors will be "SYSTEM ERRORS" that will generally exit the program, requiring restarting the program after the problem has been located. Only the part program being generated at the time of the error will be invalid.

"EDIT"

EDIT is used to add or modify data in the BURRBLOK data file. The BURRBLOK data file contains the data that defines the size and geometry of each bur blank that will be used. Before EDIT is used, refer to Section D and Appendix B for the details of the values to be used for each parameter.

"LIST"

LIST is used to display the first six digits of the EDP number and the corresponding part description for specific bur shapes and sizes of data that is contained in the data file "BURRBLOK". The screen will display 18 lines of data at a time. An additional 18 lines of data can be displayed by responding "Y" and RETURN. The data displayed by "LIST" will be in the order of the data in the data file "BURRBLOK", in general the data will be chronological order with the last data to be edited or added to the file at the end. To use LIST, enter "LIST" and RETURN.

"QUIT"

QUIT is used to end a programming session. To use QUIT, enter "QUIT" and RETURN.

An example of a part programming session is included in Appendix H.

There are several data files that are associated with the program BURR. Listings of these data files are given in appendices A, B, and C. It is not necessary to have specific knowledge of any of these files since the BURR program handles all interactions.

1. "BURRBLOK"
2. "MACHDATA"
3. OUTPUT FILE

MAKING THE BUR

To begin operations, the main power to the machine and controller should be energized. To accomplish this:

1. Ensure the main bus disconnect is energized.
2. Ensure the three disconnect switches on the power panel (motor, pump, and controller transformer) are energized.
3. Place MAN/AUTO swithces in "AUTO" (motor and pump).
4. Check power lights on the transformer and the phase fault detedtor. Both should be "ON". If the phase fault detector has not been energized, push the "RESET" button.

Power is now available to operate the machine and the ANOMATIC II controller. (For maximum stability, the power conditioning transformer should be allowed to warm up for several hours.)

There are two switches that must be turned ON in order to provide power to the controller and components inside the controller cabinet. The first switch is the main power switch. This switch lights up when the controller is ON. The second switch is inside the back of the controller cabinet on the 115VAC bus strip (a small red pilot light is lit when the bus strip power is ON). Once the bur grinding system is in a "normal" operating environment, the 115VAC bus strip power supply will be ON all of the time. In addition it is possible to turn the probe ON and OFF from a switch on the front of the probe control panel. The probe is powered from the bus strip so there is no need to turn the probe off seperately. Within approximately thirty seconds after the system is turned on, the CRT display messages should be visible. Refer to the ANOMATIC II Operating and Programming Instruction Manual for a complete defination of the controller operating features.

EMERGENCY STOP

Push the red push button on the front panel of the ANORAD controller. This action should bring all motion to an immediate halt, and turn off the control computer. Therefore after an emergency stop, it will be necessary to restart the system in the same manner as above.

SYSTEM INITIALIZATION

There are three ways to initialize or HOME the system. The primary method uses a custom HOME sequence located within the NC prom. It is enacted with the "home" key. The resulting HOME sequence is as follows; Y axis, X axis, then all others. This is the method that normally should be used. It will insure that the machine tables will not run into the grinding wheel while going HOME. The second is to use the "HOME" key. This will cause the Z axis to HOME then followed by all others. The controller must be in the JOG mode to operate. The third method is to manually enter a "M99x" using the keyboard. The x is a option that will allow the operator to specify a single axis to initialize. If omitted, all axes will HOME together.

PROGRAM STORAGE

This is done by using the "G65" command, entered through the keyboard. A floppy disk must be loaded in the disk drive before the "G65" can be executed. This command will store the current memory contents after the last previously stored program. For a more complete description of the "G65" command see the Operation and Programming Instruction manual.

READING A PROGRAM FROM DISK

This is done by using the "G64x" command, entered through the keyboard. The x specifies the location of the program on the disk. A disk with the desired program must be loaded in the disk drive before the "G64" command can be executed. To see a directory of the contents on the disk enter a "G64 255". This command will load the directory into memory (note-the previous memory contents will be lost). Care should be used when using the directory command. If a "G65 255" is entered by mistake, all contents of the disk will be lost. "G65 255" is the command to format the disk. For a more complete description of the "G64" command see the Operation and Programming Instruction manual.

EDITING PROGRAM

This is performed by putting the controller into the EDIT mode. The cursor is then positioned within the program to the point of change. The modification can then be made using the insert/delete functions. Upon completion of the desired modifications the system is returned to the normal operation mode. For a more complete description of the EDIT commands see the Operation and Programming Instruction manual.

RUNNING PROGRAM

After a program has been loaded into the memory, it is ready to run. Program operation is initalized with the "RESET" key. The program is then started with the "AUTO" key. For a more complete description of the execution commands see the Operation and Programming Instruction manual. A experienced programmer/operator may enter and run programs by this method. However, great care must be taken if manually entered programs are used.

RUNNING "BURR" PROGRAMS

Programs that are created by the automatic program program generator contain several special features that simplify the operation of the system. Many of the functions are performed automatically by the program, but there are several operations and run time adjustments that must be performed by the operator. The options will be listed in a complete form in a later section, but the most important operations will be discussed in the approximate order that they are used.

"FUNCTION 6"

Before the execution of these programs, the tables must be set to their starting positions and the coordinate system defined. This operation is accomplished automatically by using the "FUNCTION 6" key. In order for this function to operate, a bur program must be resident in the ANORAD memory.

RUNTIME VARIABLES

After hitting the "AUTO" key, the bur programs will display seven run-time variables. The functions of these variables are as follows:

V1—This variable contains the current grinding wheel diameter measured at the lower corner of the wheel. The variable must be entered from the keyboard before continued program execution. The input format is "V1=x.xxx<ENTER>" where x.xxx is the measured diameter. This variable is to be manually changed as the grinding wheel wears. The program will not change the value of this variable. It can also be used to compensate for under/over size blanks. It should be varied until sharp flutes are achieved.

V2—This variable is a flag to indicate to the program whether or not the blank should be measured with the probe. This can be used after the blank has been previously measured. It should always be used if the nose of the blank has been ground. This will prevent the profile from being shifted along the blank due to a different blank measurement. The input format is "V2=x<ENTER>" where x is either a 0 or a 1. The variable will automatically be set to a default value of 0. This will tell the program to measure the blank.

V3—This variable is to be used when a partial number of flutes are to be ground. This option is intended for flute inspection without running a complete bur. The system will return to the starting position after the specified number of flute have been ground. After inspection and any modification have been made, the "AUTO" key can be hit and the flutes will be recut. The automatic default value is 0. This variable is reset to the default value after each return to the starting position.

V4—This variable modifies the starting angle of the end cutting flutes. This is to be used for the compensation of the grinding wheel profile. If the wheel profile has flatted, then starting angle can be decreased thereby forcing the flutes to meet at the nose. Or if the wheel profile angle is greater than normal, the starting angle can be increased thus preventing the end cutting flutes from overlapping. The input format is "V4=x.xxx <ENTER>" where x.xxx is the desired angle change in degrees. The automatic default value is 0.0, however once the angle has been manually modified, it will maintain the modified value until manually changed again. Note, this variable should not be changes during the middle of a run.

V5—This variable modifies the finishing angle of all flutes. This is to be used when there is a interference problem with the grinding wheel and either the bur shank and/or tool holder. It's operation and default value is the same as V4.

V6—This variable modifies the measured length of the bur blank. It is to be used to shift the bur profile along the central axis of the bur. It is intended for the compensation of non-standard blanks. The automatic default value is 0.0. It's value is changed manually and will remain changed until manually changed again. The input format is "V6=x.xxx<ENTER>" where x.xxx is the length of the shift in inches. Note, this variable should not be changed during the middle of a run.

V7—This variable is a flag to tell the program to directly continue with the next flute. It is to be used after V3 when no modifications have been made to the other variables. The automatic default value is 0. When this variable is manually set to 1, the program will continue on the next flute. For example, if on the previous operation V3 was set to 3 and three flutes were ground that required no modifications, V4 can be set and the program will continue with the fourth flute. The flag is reset to 0 each time the machine returns to the starting position.

After the above variables have been set to the desired values, the "AUTO" key can be pressed and the program will execute.

SPECIAL FUNCTIONS

There have been three custom routines loaded into the NC prom. These routines are accessed through the function keys 1 to 3. Their operation is as follows:

FUNCTION 1—Turns the spindle motor "ON" or "OFF".

FUNCTION 2—Turns the coolant pump motor "ON" or "OFF".

FUNCTION 3—Turns the operater warnning light "ON" or "OFF".

FUNCTION 4—NOT USED.

FUNCTION 5—NOT USED.

FUNCTION 6—Sets the machine axes to starting position.

TRANSFERRING THE PROGRAM

The programs for the ANORAD are generated by the SUPERBRAIN II microcomputer and transferred electronically to the ANORAD controller. This transfer is accomplished electrically through the RS232 communications ports that are available on both machines. A properly configured cable is provided. However detail pin assignments are given in the paragraph 7.3.5 of the ANORAD Operating and Programming Instruction Manual, and on page 4-22 of the SUPERBRAIN II Users Manual. The RS232 port of the ANORAD controller is always active but since any data or programs that are transferred will be appended to the end of the current programs, it is desirable to clear the memory prior to transferring each program. The procedure for clearing the memory of the ANORAD controller is:

1. enter EDIT mode (press the red "EDIT/EXIT" key;
2. clear memory (press "CLEAR MEM" key;
3. return to the NORMAL OPERATIONS mode (press the red "EDIT/EXIT" key.

The ANORAD ANOMATIC II controller is now ready to recieve a new program.

From the SUPERBRAIN II use the program "PIP". This program is a general purpose data transfer program that is slightly modified to impliment the IN: and OUT: functions. To transfer a file to the ANORAD controller use the following commands.

A >PIP OUT:=B:xxxxxx.xxx(RETURN) followed by a "Y" and a CTRL B (the control key and the B key simultaneously).

As a result of this proceedure, the file (xxxxxx.xxx) will be transferred to the ANOMATIC II controller and displayed on the display of the SUPERBRAIN II. When the transfer is complete, the SUPERBRAIN II will display "A½" on the last line of the screen. The program is now ready to be used on the ANOMATIC II controller.

APPENDIX A

Date Base Introduction

There are 21 data entries used to define a burr profile (includes base EDP No. and a part description) in the generic data base. There must be a valve entered for each entry. If any given entry is not applicable, enter a default valve of zero. All burrs must conform to one of the pre-defines styles. There styles and their appropriate dimensions are detailed on the following worksheets. Default valves are already inserted where applicable. All profiles are drawn on a M-N axis coordinate system.

WORK SHEET: For SA and SB styles

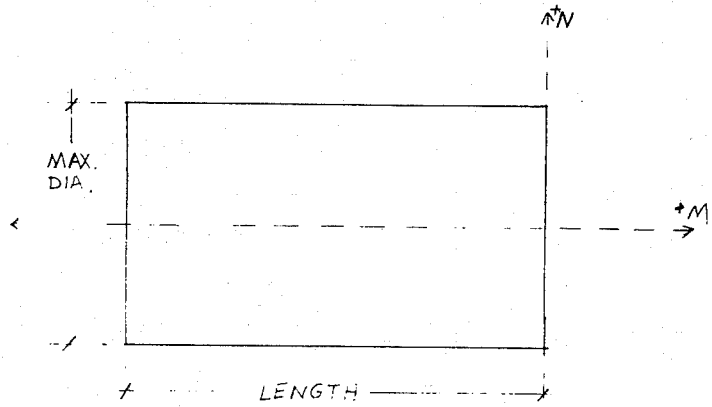

NOTE:

END CUT FLAG IS 1 FOR SA STYLES
END CUT FLAG IS O FOR SB STYLES

| | |
|---|---|
| BASE EDP # (6 digits) _____ | LENGTH OF RADIUS R2 (IN-RL) __0.0__ |
| MAX DIAMETER (IN-RL) _____ | FINISHING ANGLE FA2 (RAD-RL) __0.0__ |
| MAX HELIX ANGLE (DEG-RL) _____ | COORDINATE M3 (IN-RL) __0.0__ |
| STARTING ANGLE SA1 (RAD-RL) __0.0__ | COORDINATE N3 (IN-RL) __0.0__ |
| COORDINATE M1 (IN-RL) __0.0__ | LENGTH OF RADIUS R3 (IN-RL) __0.0__ |
| COORDINATE N1 (IN-RL) __0.0__ | FINISHING ANGLE FA3 (RAD-RL) __0.0__ |
| LENGTH OF RADIUS R1 (IN-RL) __0.0__ | LENGTH OF TAPER (IN-RL) _____ |
| FINISHING ANGLE FA1 (RAD-RL) __0.0__ | TAPER ANGLE (IN-RL) __0.0__ |
| COORDINATE M2 (IN-RL) __0.0__ | END DIAMETER (IN-RL) __0.0__ |
| COORDINATE N2 (IN-RL) __0.0__ | END CUT FLAG (0/1) _____ |
| DESCRIPTION (30 characters max) _____ | | key:  (IN-RL) – real units in inches        (DEG-RL) – real units in degrees
      (RAD-RL) – real units in radians       180 degrees = 3.14159 radians

WORK SHEET: For SC and SL Styles

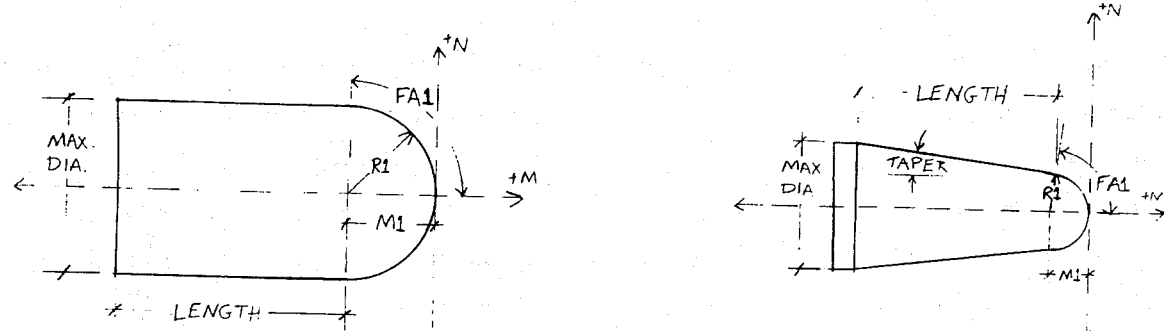

NOTE:

THE TAPER ANGLE IS 0.0 FOR SC STYLES

| | |
|---|---|
| BASE EDP # (6 digits) _____ | LENGTH OF RADIUS R2 (IN-RL) __O.O__ |
| MAX DIAMETER (IN-RL) _____ | FINISHING ANGLE FA2 (RAD-RL) __O.O__ |
| MAX HELIX ANGLE (DEG-RL) _____ | COORDINATE M3 (IN-RL) __O.O__ |
| STARTING ANGLE SA1 (RAD-RL) __O.O__ | COORDINATE N3 (IN-RL) __O.O__ |
| COORDINATE M1 (IN-RL) _____ | LENGTH OF RADIUS R3 (IN-RL) __O.O__ |
| COORDINATE N1 (IN-RL) __O.O__ | FINISHING ANGLE FA3 (RAD-RL) __O.O__ |
| LENGTH OF RADIUS R1 (IN-RL) _____ | LENGTH OF TAPER (IN-RL) _____ |
| FINISHING ANGLE FA1 (RAD-RL) _____ | TAPER ANGLE (IN-RL) _____ |
| COORDINATE M2 (IN-RL) __O.O__ | END DIAMETER (IN-RL) __O.O__ |
| COORDINATE N2 (IN-RL) __O.O__ | END CUT FLAG (0/1) __O__ |

DESCRIPTION (30 characters max) _____ key: (IN-RL) - real units in inches    (DEG-RL) - real units in degrees
     (RAD-RL) - real units in radians   180 degrees = 3.14159 radians

WORK SHEET: For SG and SD Styles

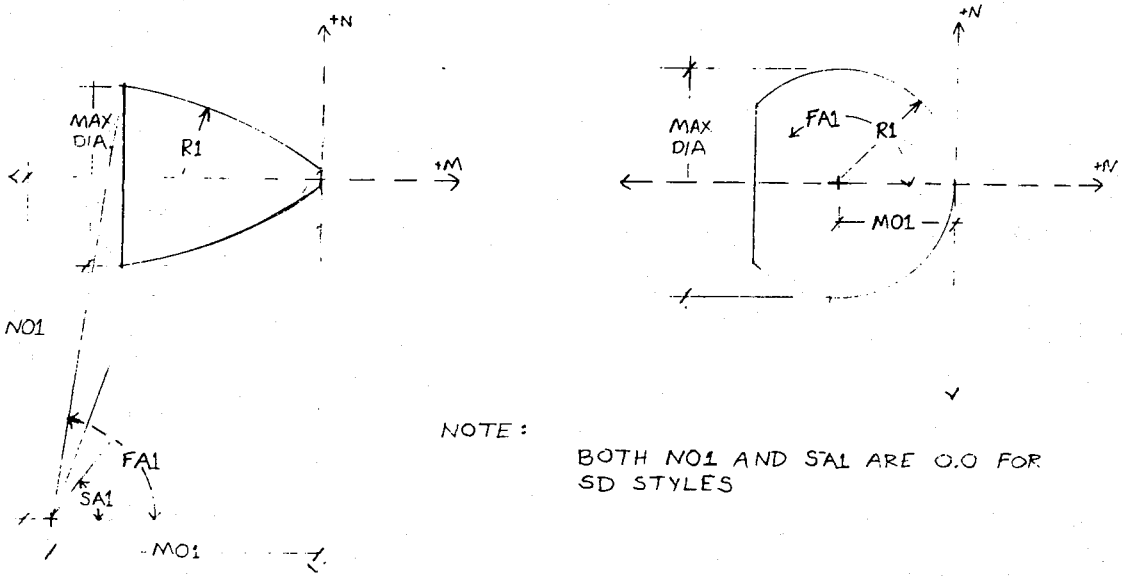

NOTE: BOTH NO1 AND SA1 ARE 0.0 FOR SD STYLES

| | |
|---|---|
| BASE EDP # (6 digits) _____ | LENGTH OF RADIUS R2 (IN-RL) __O.O__ |
| MAX DIAMETER (IN-RL) _____ | FINISHING ANGLE FA2 (RAD-RL) __O.O__ |
| MAX HELIX ANGLE (DEG-RL) _____ | COORDINATE M3 (IN-RL) __O.O__ |
| STARTING ANGLE SA1 (RAD-RL) _____ | COORDINATE N3 (IN-RL) __O.O__ |
| COORDINATE M1 (IN-RL) _____ | LENGTH OF RADIUS R3 (IN-RL) __O.O__ |
| COORDINATE N1 (IN-RL) _____ | FINISHING ANGLE FA3 (RAD-RL) __O.O__ |
| LENGTH OF RADIUS R1 (IN-RL) _____ | LENGTH OF TAPER (IN-RL) __O.O__ |
| FINISHING ANGLE FA1 (RAD-RL) _____ | TAPER ANGLE (IN-RL) __O.O__ |
| COORDINATE M2 (IN-RL) __O.O__ | END DIAMETER (IN-RL) __O.O__ |
| COORDINATE N2 (IN-RL) __O.O__ | END CUT FLAG (0/1) __O__ |

DESCRIPTION (30 characters max) _____ key: (IN-RL) - real units in inches    (DEG-RL) - real units in degrees
     (RAD-RL) - real units in radians   180 degrees = 3.14159 radians WORK SHEET: for SF, SE and SH Styles

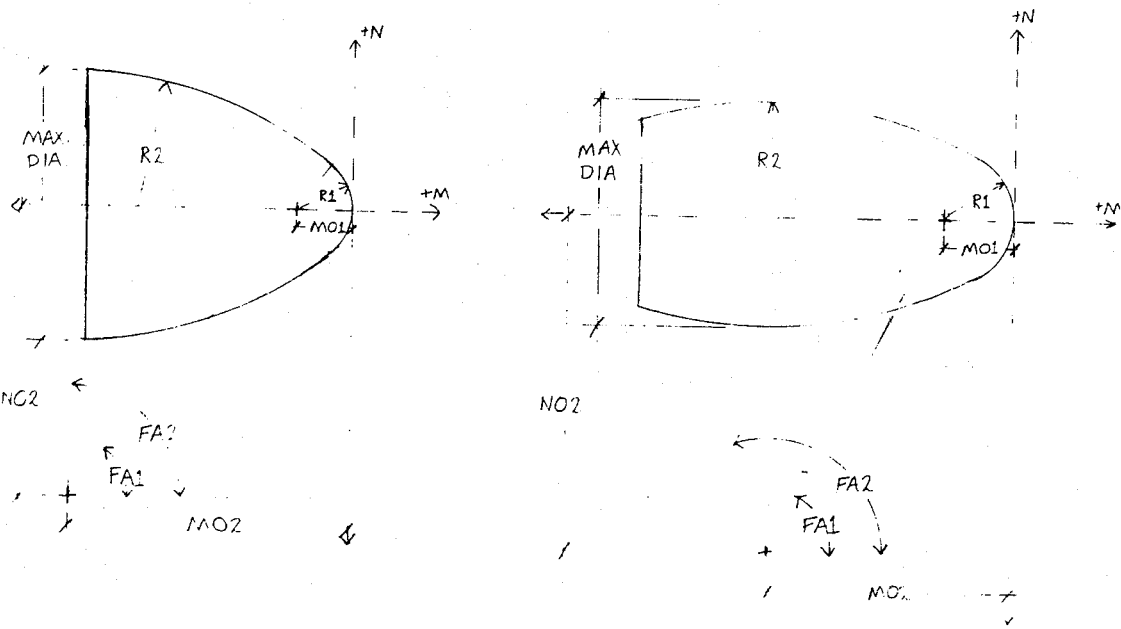

BASE EDP # (6 digits) _____

MAX DIAMETER (IN-RL) _____

MAX HELIX ANGLE (DEG-RL) _____

STARTING ANGLE SA1 (RAD-RL) __0.0__

COORDINATE M1 (IN-RL) _____

COORDINATE N1 (IN-RL) __0.0__

LENGTH OF RADIUS R1 (IN-RL) _____

FINISHING ANGLE FA1 (RAD-RL) _____

COORDINATE M2 (IN-RL) _____

COORDINATE N2 (IN-RL) _____

LENGTH OF RADIUS R2 (IN-RL) _____

FINISHING ANGLE FA2 (RAD-RL) _____

COORDINATE M3 (IN-RL) __0.0__

COORDINATE N3 (IN-RL) __0.0__

LENGTH OF RADIUS R3 (IN-RL) __0.0__

FINISHING ANGLE FA3 (RAD-RL) __0.0__

LENGTH OF TAPER (IN-RL) __0.0__

TAPER ANGLE (IN-RL) __0.0__

END DIAMETER (IN-RL) __0.0__

END CUT FLAG (0/1) __0__

DESCRIPTION (30 characters max) _____ key:   (IN-RL) - real units in inches     (DEG-RL) - real units in degrees
       (RAD-RL) - real units in radians   180 degrees = 3.14159 radians

WORK SHEET: For SH Styles

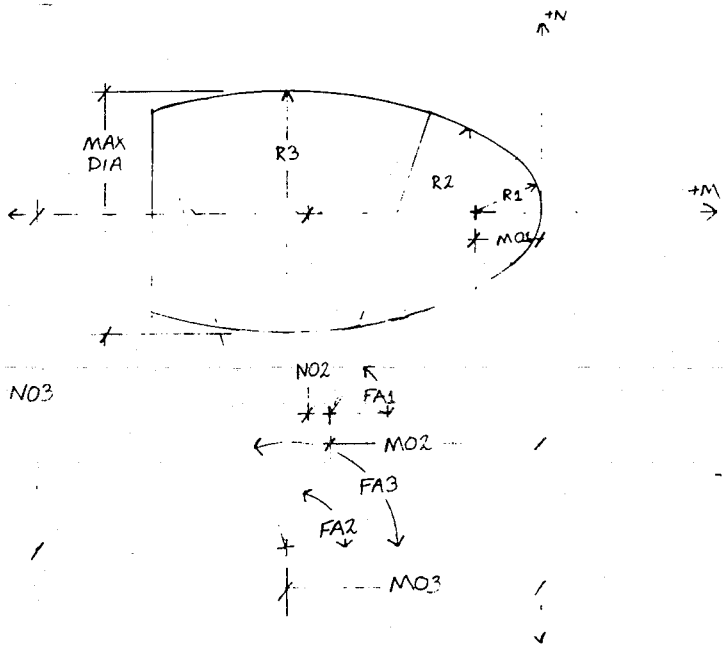

| | |
|---|---|
| BASE EDP # (6 digits) _____ | LENGTH OF RADIUS R2 (IN-RL) _____ |
| MAX DIAMETER (IN-RL) _____ | FINISHING ANGLE FA2 (RAD-RL) _____ |
| MAX HELIX ANGLE (DEG-RL) _____ | COORDINATE M3 (IN-RL) _____ |
| STARTING ANGLE SA1 (RAD-RL) __0.0__ | COORDINATE N3 (IN-RL) _____ |
| COORDINATE M1 (IN-RL) _____ | LENGTH OF RADIUS R3 (IN-RL) _____ |
| COORDINATE N1 (IN-RL) __0.0__ | FINISHING ANGLE FA3 (RAD-RL) _____ |
| LENGTH OF RADIUS R1 (IN-RL) _____ | LENGTH OF TAPER (IN-RL) __0.0__ |
| FINISHING ANGLE FA1 (RAD-RL) _____ | TAPER ANGLE (IN-RL) __0.0__ |
| COORDINATE M2 (IN-RL) _____ | END DIAMETER (IN-RL) __0.0__ |
| COORDINATE N2 (IN-RL) _____ | END CUT FLAG (0/1) __0__ |

DESCRIPTION (30 characters max) _____ key: (IN-RL) - real units in inches   (DEG-RL) - real units in degrees
     (RAD-RL) - real units in radians  180 degrees = 3.14159 radians

WORK SHEET: For SJ, SK and SM Styles

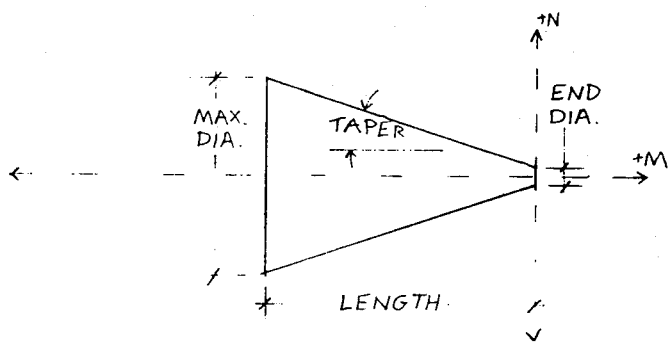

| | |
|---|---|
| BASE EDP # (6 digits) _____ | LENGTH OF RADIUS R2 (IN-RL) \_\_\_0.0\_\_\_ |
| MAX DIAMETER (IN-RL) _____ | FINISHING ANGLE FA2 (RAD-RL) \_\_\_0.0\_\_\_ |
| MAX HELIX ANGLE (DEG-RL) _____ | COORDINATE M3 (IN-RL) \_\_\_0.0\_\_\_ |
| STARTING ANGLE SA1 (RAD-RL) \_\_\_0.0\_\_\_ | COORDINATE N3 (IN-RL) \_\_\_0.0\_\_\_ |
| COORDINATE M1 (IN-RL) \_\_\_0.0\_\_\_ | LENGTH OF RADIUS R3 (IN-RL) \_\_\_0.0\_\_\_ |
| COORDINATE N1 (IN-RL) \_\_\_0.0\_\_\_ | FINISHING ANGLE FA3 (RAD-RL) \_\_\_0.0\_\_\_ |
| LENGTH OF RADIUS R1 (IN-RL) \_\_\_0.0\_\_\_ | LENGTH OF TAPER (IN-RL) _____ |
| FINISHING ANGLE FA1 (RAD-RL) \_\_\_0.0\_\_\_ | TAPER ANGLE (IN-RL) _____ |
| COORDINATE M2 (IN-RL) \_\_\_0.0\_\_\_ | END DIAMETER (IN-RL) _____ |
| COORDINATE N2 (IN-RL) \_\_\_0.0\_\_\_ | END CUT FLAG (0/1) \_\_\_0\_\_\_ |

DESCRIPTION (30 characters max) _____ key: (IN-RL) - real units in inches  (DEG-RL) - real units in degrees
     (RAD-RL) - real units in radians  180 degrees = 3.14159 radians

WORK SHEET: For SN Styles

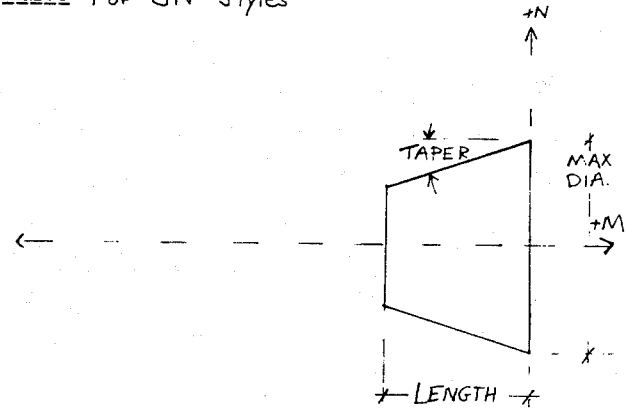

NOTE: TAPER ANGLE MUST BE NEGATIVE

| | |
|---|---|
| BASE EDP # (6 digits) _____ | LENGTH OF RADIUS R2 (IN-RL) \_\_\_0.0\_\_\_ |
| MAX DIAMETER (IN-RL) _____ | FINISHING ANGLE FA2 (RAD-RL) \_\_\_0.0\_\_\_ |
| MAX HELIX ANGLE (DEG-RL) _____ | COORDINATE M3 (IN-RL) \_\_\_0.0\_\_\_ |
| STARTING ANGLE SA1 (RAD-RL) \_\_\_0.0\_\_\_ | COORDINATE N3 (IN-RL) \_\_\_0.0\_\_\_ |
| COORDINATE M1 (IN-RL) \_\_\_0.0\_\_\_ | LENGTH OF RADIUS R3 (IN-RL) \_\_\_0.0\_\_\_ |
| COORDINATE N1 (IN-RL) \_\_\_0.0\_\_\_ | FINISHING ANGLE FA3 (RAD-RL) \_\_\_0.0\_\_\_ |
| LENGTH OF RADIUS R1 (IN-RL) \_\_\_0.0\_\_\_ | LENGTH OF TAPER (IN-RL) _____ |
| FINISHING ANGLE FA1 (RAD-RL) \_\_\_0.0\_\_\_ | TAPER ANGLE (IN-RL) _____ |
| COORDINATE M2 (IN-RL) \_\_\_0.0\_\_\_ | END DIAMETER (IN-RL) \_\_\_0.0\_\_\_ |
| COORDINATE N2 (IN-RL) \_\_\_0.0\_\_\_ | END CUT FLAG (0/1) \_\_\_0\_\_\_ |

DESCRIPTION (30 characters max) _____ key: (IN-RL) - real units in inches  (DEG-RL) - real units in degrees
     (RAD-RL) - real units in radians  180 degrees = 3.14159 radians

APPENDIX B

BURRBLOK Data File Listing

```
420250
  0.2500  0.0000 -0.1250  0.0000  0.1250  1.5708  0.0000  0.0000  0.0000
  0.0000  0.0000  0.0000  0.0000  0.0000  0.3750  0.0000  0.0000 25.0000  0
      1/4 X 1/2 CYL BALL NOSE
420312
  0.3125  0.0000 -0.1563  0.0000  0.1563  1.5708  0.0000  0.0000  0.0000
  0.0000  0.0000  0.0000  0.0000  0.0000  0.5937  0.0000  0.0000 25.0000  0
      5/16 X 3/4 CYL BALL NOSE
420375
  0.3750  0.0000 -0.1875  0.0000  0.1875  1.5708  0.0000  0.0000  0.0000
  0.0000  0.0000  0.0000  0.0000  0.0000  0.5625  0.0000  0.0000 25.0000  0
      3/8 X 3/4 CYL BALL NOSE
420437
  0.4375  0.0000 -0.2188  0.0000  0.2188  1.5708  0.0000  0.0000  0.0000
  0.0000  0.0000  0.0000  0.0000  0.0000  0.7812  0.0000  0.0000 25.0000  0
      7/16 X 1 CYL BALL NOSE
420500
  0.5000  0.0000 -0.2500  0.0000  0.2500  1.5708  0.0000  0.0000  0.0000
  0.0000  0.0000  0.0000  0.0000  0.0000  0.7500  0.0000  0.0000 25.0000  0
      1/2 X 1 CYL BALL NOSE
420625
  0.6250  0.0000 -0.3125  0.0000  0.3125  1.5708  0.0000  0.0000  0.0000
  0.0000  0.0000  0.0000  0.0000  0.0000  0.6875  0.0000  0.0000 25.0000  0
      5/8 X 1 CYL BALL NOSE
420750
  0.7500  0.0000 -0.3750  0.0000  0.3750  1.5708  0.0000  0.0000  0.0000
  0.0000  0.0000  0.0000  0.0000  0.0000  0.6250  0.0000  0.0000 25.0000  0
      3/4 X 1 CYL BALL NOSE
430250
  0.2500  0.0000 -0.1250  0.0000  0.1250  2.0595  0.0000  0.0000  0.0000
  0.0000  0.0000  0.0000  0.0000  0.0000  0.0000  0.0000  0.0000 25.0000  0
             1/4 BALL
430312
  0.3125  0.0000 -0.1563  0.0000  0.1563  2.0595  0.0000  0.0000  0.0000
  0.0000  0.0000  0.0000  0.0000  0.0000  0.0000  0.0000  0.0000 25.0000  0
             5/16 BALL
```

430375

0.3750  0.0000  -0.1875  0.0000  0.1875  2.0595  0.0000  0.0000  0.0000
0.0000  0.0000  0.0000  0.0000  0.0000  0.0000  0.0000  0.0000  25.0000  0

3/8 BALL

430437

0.4375  0.0000  -0.2188  0.0000  0.2188  2.0595  0.0000  0.0000  0.0000
0.0000  0.0000  0.0000  0.0000  0.0000  0.0000  0.0000  0.0000  25.0000  0

7/16 BALL

430500

0.5000  0.0000  -0.2500  0.0000  0.2500  2.0595  0.0000  0.0000  0.0000
0.0000  0.0000  0.0000  0.0000  0.0000  0.0000  0.0000  0.0000  25.0000  0

1/2 BALL

430625

0.6250  0.0000  -0.3125  0.0000  0.3125  2.0595  0.0000  0.0000  0.0000
0.0000  0.0000  0.0000  0.0000  0.0000  0.0000  0.0000  0.0000  25.0000  0

5/8 BALL

430750

0.7500  0.0000  -0.3750  0.0000  0.3750  2.0595  0.0000  0.0000  0.0000
0.0000  0.0000  0.0000  0.0000  0.0000  0.0000  0.0000  0.0000  25.0000  0

3/4 BALL

440250

0.2500  0.0000  -0.0915  0.0000  0.0915  1.2546  -0.2359  -0.2945  0.4195
1.9088  0.0000  0.0000  0.0000  0.0000  0.0000  0.0000  0.0000  25.0000  0

1/4 EGG

440375

0.3750  0.0000  -0.1535  0.0000  0.1535  1.2620  -0.3720  -0.6850  0.8725
1.8650  0.0000  0.0000  0.0000  0.0000  0.0000  0.0000  0.0000  25.0000  0

3/8 EGG

440500

0.5000  0.0000  -0.2005  0.0000  0.2005  1.2621  -0.5186  -0.9975  1.2475
1.8605  0.0000  0.0000  0.0000  0.0000  0.0000  0.0000  0.0000  25.0000  0

1/2 EGG

440625

0.6250  0.0000  -0.2475  0.0000  0.2475  1.2083  -0.6021  -0.9350  1.2475
1.8850  0.0000  0.0000  0.0000  0.0000  0.0000  0.0000  0.0000  25.0000  0

5/8 EGG

440750

0.7500  0.0000 -0.3095  0.0000  0.3095  1.0445 -0.5526 -0.4185  0.7935

2.0945  0.0000  0.0000  0.0000  0.0000  0.0000  0.0000  0.0000 25.0000  0

3/4 EGG

490250

0.2500  0.0000  0.0000  0.0000  0.0000  0.0000  0.0000  0.0000  0.0000

0.0000  0.0000  0.0000  0.0000  0.0000  0.5000 11.0000  0.0500 25.0000  0

1/4 X 22 DEG CONE

490375

0.3750  0.0000  0.0000  0.0000  0.0000  0.0000  0.0000  0.0000  0.0000

0.0000  0.0000  0.0000  0.0000  0.0000  0.6250 14.0000  0.0600 25.0000  0

3/8 X 28 DEG CONE

490500

0.5000  0.0000  0.0000  0.0000  0.0000  0.0000  0.0000  0.0000  0.0000

0.0000  0.0000  0.0000  0.0000  0.0000  0.8750 14.0000  0.0600 25.0000  0

1/2 X 28 DEG CONE

490625

0.6250  0.0000  0.0000  0.0000  0.0000  0.0000  0.0000  0.0000  0.0000

0.0000  0.0000  0.0000  0.0000  0.0000  1.0000 15.5000  0.0650 25.0000  0

5/8 X 31 DEG CONE

470312

0.3125  0.0000 -0.0608  0.0000  0.0608  1.0212 -0.4818 -0.9046  1.0608

1.8248  0.0000  0.0000  0.0000  0.0000  0.0000  0.0000  0.0000 25.0000  0

5/16 FLAME

470500

0.5000  0.0000 -0.0915  0.0000  0.0915  1.0651 -0.8465 -1.7475  1.9975

1.7735  0.0000  0.0000  0.0000  0.0000  0.0000  0.0000  0.0000 25.0000  0

1/2 FLAME

470625

0.6250  0.0000 -0.0915  0.0000  0.0915  0.7995 -0.5488 -0.4704  0.7475

1.3532 -0.8725 -1.9350  2.2475  1.7370  0.0000  0.0000  0.0000 25.0000  0

5/8 FLAME

470750

0.7500  0.0000 -0.1535  0.0000  0.1535  1.0596 -0.9935 -1.4975  1.8725

1.8608  0.0000  0.0000  0.0000  0.0000  0.0000  0.0000  0.0000 25.0000  0

3/4 FLAME

```
480312
   0.3125  0.0000 -0.0550  0.0000  0.0550  1.4486  0.0000  0.0000  0.0000
   0.0000  0.0000  0.0000  0.0000  0.0000  0.8267  7.0000  0.0000 25.0000  0
     5/16 X 1 X 14 DEG B.N. CONE
480375
   0.3750  0.0000 -0.0650  0.0000  0.0650  1.4486  0.0000  0.0000  0.0000
   0.0000  0.0000  0.0000  0.0000  0.0000  1.0054  7.0000  0.0000 25.0000  0
    3/8 X 1-3/16 X 14 DEG B.N.CONE
480500
   0.5000  0.0000 -0.1260  0.0000  0.1260  1.4486  0.0000  0.0000  0.0000
   0.0000  0.0000  0.0000  0.0000  0.0000  1.0144  7.0000  0.0000 25.0000  0
    1/2 X 1-1/4 X 14 DEG B.N. CONE
480625
   0.6250  0.0000 -0.1710  0.0000  0.1710  1.4486  0.0000  0.0000  0.0000
   0.0000  0.0000  0.0000  0.0000  0.0000  1.1623  7.0000  0.0000 25.0000  0
    5/8 X 1-7/16 X 14 DEG B.N.CONE
480750
   0.7500  0.0000 -0.2160  0.0000  0.2160  1.4486  0.0000  0.0000  0.0000
   0.0000  0.0000  0.0000  0.0000  0.0000  1.3103  7.0000  0.0000 25.0000  0
    3/4 X 1-5/8 X 14 DEG B.N. CONE
400250
   0.2500  0.0000  0.0000  0.0000  0.0000  0.0000  0.0000  0.0000  0.0000
   0.0000  0.0000  0.0000  0.0000  0.0000  0.3125  0.0000  0.0000 25.0000  1
      1/4 X 3/16 CYL END CUT
400251
   0.2500  0.0000  0.0000  0.0000  0.0000  0.0000  0.0000  0.0000  0.0000
   0.0000  0.0000  0.0000  0.0000  0.0000  0.5000  0.0000  0.0000 25.0000  1
      1/4 X 1/2 CYL END CUT
400312
   0.3125  0.0000  0.0000  0.0000  0.0000  0.0000  0.0000  0.0000  0.0000
   0.0000  0.0000  0.0000  0.0000  0.0000  0.7500  0.0000  0.0000 25.0000  1
      5/16 X 3/4 CYL END CUT
400375
   0.3750  0.0000  0.0000  0.0000  0.0000  0.0000  0.0000  0.0000  0.0000
   0.0000  0.0000  0.0000  0.0000  0.0000  0.7500  0.0000  0.0000 25.0000  1
      3/8 X 3/4 CYL END CUT
400437
   0.4375  0.0000  0.0000  0.0000  0.0000  0.0000  0.0000  0.0000  0.0000
   0.0000  0.0000  0.0000  0.0000  0.0000  1.0000  0.0000  0.0000 25.0000  1
      7/16 X 1 CYL END CUT
```

400500

0.5000  0.0000  0.0000  0.0000  0.0000  0.0000  0.0000  0.0000  0.0000

0.0000  0.0000  0.0000  0.0000  0.0000  1.0000  0.0000  0.0000 25.0000 1

1/2 X 1 CYL END CUT

400625

0.6250  0.0000  0.0000  0.0000  0.0000  0.0000  0.0000  0.0000  0.0000

0.0000  0.0000  0.0000  0.0000  0.0000  1.0000  0.0000  0.0000 25.0000 1

5/8 X 1 CYL END CUT

400752

0.7500  0.0000  0.0000  0.0000  0.0000  0.0000  0.0000  0.0000  0.0000

0.0000  0.0000  0.0000  0.0000  0.0000  0.5000  0.0000  0.0000 25.0000 1

3/4 X 1/2 CYL END CUT

400751

0.7500  0.0000  0.0000  0.0000  0.0000  0.0000  0.0000  0.0000  0.0000

0.0000  0.0000  0.0000  0.0000  0.0000  0.7500  0.0000  0.0000 25.0000 1

3/4 X 3/4 CYL END CUT

400875

0.8750  0.0000  0.0000  0.0000  0.0000  0.0000  0.0000  0.0000  0.0000

0.0000  0.0000  0.0000  0.0000  0.0000  1.0000  0.0000  0.0000 25.0000 1

7/8 X 1 CYL END CUT

400750

0.7500  0.0000  0.0000  0.0000  0.0000  0.0000  0.0000  0.0000  0.0000

0.0000  0.0000  0.0000  0.0000  0.0000  1.0000  0.0000  0.0000 25.0000 1

3/4 X 1 CYL END CUT

401000

1.0000  0.0000  0.0000  0.0000  0.0000  0.0000  0.0000  0.0000  0.0000

0.0000  0.0000  0.0000  0.0000  0.0000  1.0000  0.0000  0.0000 25.0000 1

1 X 1 CYL END CUT

410250

0.2500  0.0000  0.0000  0.0000  0.0000  0.0000  0.0000  0.0000  0.0000

0.0000  0.0000  0.0000  0.0000  0.0000  0.3125  0.0000  0.0000 25.0000 0

1/4 X 3/16 CYLINDRICAL

410251

0.2500  0.0000  0.0000  0.0000  0.0000  0.0000  0.0000  0.0000  0.0000

0.0000  0.0000  0.0000  0.0000  0.0000  0.5000  0.0000  0.0000 25.0000 0

1/4 X 1/2 CYLINDRICAL

410312

0.3125  0.0000  0.0000  0.0000  0.0000  0.0000  0.0000  0.0000  0.0000

0.0000  0.0000  0.0000  0.0000  0.0000  0.7500  0.0000  0.0000  25.0000  0
    5/16 X 3/4 CYLINDRICAL

410375

0.3750  0.0000  0.0000  0.0000  0.0000  0.0000  0.0000  0.0000  0.0000

0.0000  0.0000  0.0000  0.0000  0.0000  0.7500  0.0000  0.0000  25.0000  0
    3/8 X 3/4 CYLINDRICAL

410437

0.4375  0.0000  0.0000  0.0000  0.0000  0.0000  0.0000  0.0000  0.0000

0.0000  0.0000  0.0000  0.0000  0.0000  1.0000  0.0000  0.0000  25.0000  0
    7/16 X 1 CYLINDRICAL

410500

0.5000  0.0000  0.0000  0.0000  0.0000  0.0000  0.0000  0.0000  0.0000

0.0000  0.0000  0.0000  0.0000  0.0000  1.0000  0.0000  0.0000  25.0000  0
    1/2 X 1 CYLINDRICAL

410625

0.6250  0.0000  0.0000  0.0000  0.0000  0.0000  0.0000  0.0000  0.0000

0.0000  0.0000  0.0000  0.0000  0.0000  1.0000  0.0000  0.0000  25.0000  0
    5/8 X 1 CYLINDRICAL

410750

0.7500  0.0000  0.0000  0.0000  0.0000  0.0000  0.0000  0.0000  0.0000

0.0000  0.0000  0.0000  0.0000  0.0000  1.0000  0.0000  0.0000  25.0000  0
    3/4 X 1 CYLINDRICAL

410752

0.7500  0.0000  0.0000  0.0000  0.0000  0.0000  0.0000  0.0000  0.0000

0.0000  0.0000  0.0000  0.0000  0.0000  0.5000  0.0000  0.0000  25.0000  0
    3/4 X 1/2 CYLINDRICAL

410751

0.7500  0.0000  0.0000  0.0000  0.0000  0.0000  0.0000  0.0000  0.0000

0.0000  0.0000  0.0000  0.0000  0.0000  0.7500  0.0000  0.0000  25.0000  0
    3/4 X 3/4 CYLINDRICAL

410875

0.8750  0.0000  0.0000  0.0000  0.0000  0.0000  0.0000  0.0000  0.0000

0.0000  0.0000  0.0000  0.0000  0.0000  1.0000  0.0000  0.0000  25.0000  0
    7/8 X 1 CYLINDRICAL

411000

1.0000  0.0000  0.0000  0.0000  0.0000  0.0000  0.0000  0.0000  0.0000

0.0000  0.0000  0.0000  0.0000  0.0000  1.0000  0.0000  0.0000  25.0000  0
    1 X 1 CYLINDRICAL

450250

0.2500  0.0000  -0.0605  0.0000  0.0605  1.2824  -0.5048  -1.4975  1.6225

1.5678  0.0000  0.0000  0.0000  0.0000  0.0000  0.0000  0.0000  25.0000  0

1/4 X 1/2 RAD NOSE TREE

450375

0.3750  0.0000  -0.0973  0.0000  0.0973  1.2712  -0.7452  -2.0974  2.2925

1.5708  0.0000  0.0000  0.0000  0.0000  0.0000  0.0000  0.0000  25.0000  0

3/8 X 3/4 RAD NOSE TREE

450437

0.4375  0.0000  -0.9030  0.0000  0.0903  1.2776  -1.0027  -3.0223  3.2473

1.5700  0.0000  0.0000  0.0000  0.0000  0.0000  0.0000  0.0000  25.0000  0

7/16 X 1 RAD NOSE TREE

450501

0.5000  0.0000  -0.1225  0.0000  0.1225  1.1420  -0.8003  -1.4824  1.7525

1.5418  0.0000  0.0000  0.0000  0.0000  0.0000  0.0000  0.0000  25.0000  0

1/2 X 3/4 RAD NOSE TREE

450500

0.5000  0.0000  -0.1225  0.0000  0.1225  1.2728  -1.0400  -2.9873  3.2475

1.5585  0.0000  0.0000  0.0000  0.0000  0.0000  0.0000  0.0000  25.0000  0

1/2 X 1 RAD NOSE TREE

450625

0.6250  0.0000  -0.1865  0.0000  0.1865  1.2426  -1.0925  -2.6610  2.9975

1.5399  0.0000  0.0000  0.0000  0.0000  0.0000  0.0000  0.0000  25.0000  0

5/8 X 1 RAD NOSE TREE

450750

0.7500  0.0000  -0.1855  0.0000  0.1855  1.0775  -1.1022  -1.7052  2.1215

1.5217  0.0000  0.0000  0.0000  0.0000  0.0000  0.0000  0.0000  25.0000  0

3/4 X 1 RAD NOSE TREE

450752

0.7500  0.0000  -0.1855  0.0000  0.1855  1.1995  -1.3194  -2.9120  3.3105

1.4739  0.0000  0.0000  0.0000  0.0000  0.0000  0.0000  0.0000  25.0000  0

3/4 X 1-1/4 RAD NOSE TREE

450751

0.7500  0.0000  -0.1855  0.0000  0.1855  1.2796  -1.5851  -4.6698  5.0605

1.4553  0.0000  0.0000  0.0000  0.0000  0.0000  0.0000  0.0000  25.0000  0

3/4 X 1-1/2 RAD NOSE TREE

```
460250
  0.2500  1.1120 -0.4451 -0.8801  1.0050  1.5708  0.0000  0.0000  0.0000
  0.0000  0.0000  0.0000  0.0000  0.0000  0.0000  0.0000  0.0000 25.0000  0
    1/4 X 1/2 POINTED NOSE TREE
460312
  0.3125  1.2096 -0.7085 -1.8481  2.0050  1.5708  0.0000  0.0000  0.0000
  0.0000  0.0000  0.0000  0.0000  0.0000  0.0000  0.0000  0.0000 25.0000  0
    5/16 X 3/4 POINTED NOSE TREE
460375
  0.3750  1.1035 -0.6780 -1.3156  1.5050  1.5708  0.0000  0.0000  0.0000
  0.0000  0.0000  0.0000  0.0000  0.0000  0.0000  0.0000  0.0000 25.0000  0
    3/8 X 3/4 POINTED NOSE TREE
460501
  0.5000  0.9931 -0.7197 -1.0676  1.3180  1.5708  0.0000  0.0000  0.0000
  0.0000  0.0000  0.0000  0.0000  0.0000  0.0000  0.0000  0.0000 25.0000  0
    1/2 X 3/4 POINTED NOSE TREE
460500
  0.5000  1.1319 -0.9582 -2.0048  2.2550  1.5708  0.0000  0.0000  0.0000
  0.0000  0.0000  0.0000  0.0000  0.0000  0.0000  0.0000  0.0000 25.0000  0
    1/2 X 1 POINTED NOSE TREE
460625
  0.6250  1.0219 -0.9808 -1.5674  1.8800  1.5708  0.0000  0.0000  0.0000
  0.0000  0.0000  0.0000  0.0000  0.0000  0.0000  0.0000  0.0000 25.0000  0
    5/8 X 1 POINTED NOSE TREE
460750
  0.7500  0.9158 -0.9935 -1.2560  1.6310  1.5708  0.0000  0.0000  0.0000
  0.0000  0.0000  0.0000  0.0000  0.0000  0.0000  0.0000  0.0000 25.0000  0
    3/4 X 1 POINTED NOSE TREE
460751
  0.7500  1.1327 -1.4869 -3.1300  3.5050  1.5708  0.0000  0.0000  0.0000
  0.0000  0.0000  0.0000  0.0000  0.0000  0.0000  0.0000  0.0000 25.0000  0
  3/4 X 1-1/2 POINTED NOSE TREE
510375
  0.3750  0.0000  0.0000  0.0000  0.0000  0.0000  0.0000  0.0000  0.0000
  0.0000  0.0000  0.0000  0.0000  0.0000  0.2978 30.0000  0.0200 25.0000  0
        3/8 60 DEG CONE
```

510500

0.5000  0.0000  0.0000  0.0000  0.0000  0.0000  0.0000  0.0000  0.0000

0.0000  0.0000  0.0000  0.0000  0.0000  0.4053  30.0000  0.0200  25.0000  0

1/2 60 DEG CONE

510625

0.6250  0.0000  0.0000  0.0000  0.0000  0.0000  0.0000  0.0000  0.0000

0.0000  0.0000  0.0000  0.0000  0.0000  0.4867  30.0000  0.0500  25.0000  0

5/8 60 DEG CONE

510750

0.7500  0.0000  0.0000  0.0000  0.0000  0.0000  0.0000  0.0000  0.0000

0.0000  0.0000  0.0000  0.0000  0.0000  0.5950  30.0000  0.0500  25.0000  0

3/4 60 DEG CONE

510875

0.8750  0.0000  0.0000  0.0000  0.0000  0.0000  0.0000  0.0000  0.0000

0.0000  0.0000  0.0000  0.0000  0.0000  0.6495  30.0000  0.1100  25.0000  0

7/8 60 DEG CONE

511000

1.0000  0.0000  0.0000  0.0000  0.0000  0.0000  0.0000  0.0000  0.0000

0.0000  0.0000  0.0000  0.0000  0.0000  0.7578  30.0000  0.1100  25.0000  0

1 60 DEG CONE

520375

0.3750  0.0000  0.0000  0.0000  0.0000  0.0000  0.0000  0.0000  0.0000

0.0000  0.0000  0.0000  0.0000  0.0000  0.1715  45.0000  0.0200  25.0000  0

3/8 90 DEG CONE

520500

0.5000  0.0000  0.0000  0.0000  0.0000  0.0000  0.0000  0.0000  0.0000

0.0000  0.0000  0.0000  0.0000  0.0000  0.2340  45.0000  0.0200  25.0000  0

1/2 90 DEG CONE

520625

0.6250  0.0000  0.0000  0.0000  0.0000  0.0000  0.0000  0.0000  0.0000

0.0000  0.0000  0.0000  0.0000  0.0000  0.2810  45.0000  0.0500  25.0000  0

5/8 90 DEG CONE

520750

0.7500  0.0000  0.0000  0.0000  0.0000  0.0000  0.0000  0.0000  0.0000

0.0000  0.0000  0.0000  0.0000  0.0000  0.3435  45.0000  0.0500  25.0000  0

3/4 90 DEG CONE

520875

0.8750  0.0000  0.0000  0.0000  0.0000  0.0000  0.0000  0.0000  0.0000

0.0000  0.0000  0.0000  0.0000  0.0000  0.3750  45.0000  0.1100  25.0000  0

7/8 90 DEG CONE

```
521000
  1.0000  0.0000  0.0000  0.0000  0.0000  0.0000  0.0000  0.0000  0.0000
  0.0000  0.0000  0.0000  0.0000  0.0000  0.4375 45.0000  0.1100 25.0000 0
            1 90 DEG CONE
500250
  0.2500  0.0000  0.0000  0.0000  0.0000  0.0000  0.0000  0.0000  0.0000
  0.0000  0.0000  0.0000  0.0000  0.0000  0.2500 -5.0000  0.0000 25.0000 0
1/4 X 1/4 10 DEG INVERTED CONE
500375
  0.3750  0.0000  0.0000  0.0000  0.0000  0.0000  0.0000  0.0000  0.0000
  0.0000  0.0000  0.0000  0.0000  0.0000  0.5000 -8.0000  0.0000 25.0000 0
3/8 X 3/8 13 DEG INVERTED CONE
500500
  0.5000  0.0000  0.0000  0.0000  0.0000  0.0000  0.0000  0.0000  0.0000
  0.0000  0.0000  0.0000  0.0000  0.0000  0.5000 -14.0000 0.0000 25.0000 0
1/2 X 1/2 28 DEG INVERTED CONE
500501
  0.5000  0.0000  0.0000  0.0000  0.0000  0.0000  0.0000  0.0000  0.0000
  0.0000  0.0000  0.0000  0.0000  0.0000  0.5000 -8.0000  0.0000 25.0000 0
1/2 X 1/2 16 DEG INVERTED CONE
500626
  0.6250  0.0000  0.0000  0.0000  0.0000  0.0000  0.0000  0.0000  0.0000
  0.0000  0.0000  0.0000  0.0000  0.0000  0.6250 -9.5000  0.0000 25.0000 0
5/8 X 5/8 19 DEG INVERTED CONE
500625
  0.6250  0.0000  0.0000  0.0000  0.0000  0.0000  0.0000  0.0000  0.0000
  0.0000  0.0000  0.0000  0.0000  0.0000  0.7500 -9.0000  0.0000 25.0000 0
5/8 X 3/4 18 DEG INVERTED CONE
500751
  0.7500  0.0000  0.0000  0.0000  0.0000  0.0000  0.0000  0.0000  0.0000
  0.0000  0.0000  0.0000  0.0000  0.0000  0.7500 -10.5000 0.0000 25.0000 0
3/4 X 3/4 21 DEG INVERTED CONE
500750
  0.7500  0.0000  0.0000  0.0000  0.0000  0.0000  0.0000  0.0000  0.0000
  0.0000  0.0000  0.0000  0.0000  0.0000  0.6250 -15.0000 0.0000 25.0000 0
3/4 X 5/8 30 DEG INVERTED CONE
480622
  0.6250  0.0000 -0.1880  0.0000  0.1880  1.4486  0.0000  0.0000  0.0000
  0.0000  0.0000  0.0000  0.0000  0.0000  1.0224  7.0000  0.0000 25.0000 0
5/8 X 1-5/16 X 14 DEG B.N.CONE
```

```
431250
   1.2500  0.0000 -0.6250  0.0000  0.6250  2.0500  0.0000  0.0000  0.0000
   0.0000  0.0000  0.0000  0.0000  0.0000  0.0000  0.0000  0.0000 25.0000  0
         1-1/4 BALL BURR
4S1111
   0.6000  0.0000  0.0000  0.0000  0.0000  0.0000  0.0000  0.0000  0.0000
   0.0000  0.0000  0.0000  0.0000  0.0000  0.8000 13.5000  0.2159 25.0000  0
      DUMMY TAPER CYLINDER BURR
431000
   1.0000  0.0000 -0.5000  0.0000  0.5000  2.0595  0.0000  0.0000  0.0000
   0.0000  0.0000  0.0000  0.0000  0.0000  0.0000  0.0000  0.0000 25.0000  0
            1 BALL
```

APPENDIX C

MACHDATA Data File Listing

| | |
|---|---|
| −14.4112 | ;X DISTANCE FROM HOME TO CONTACT WITH PROBE (REAL) |
| 4.7714 | ;Y DISTANCE FROM HOME TO CENTER OF PROBE (REAL) |
| −8.877 | ;X DISTANCE FROM HOME TO CENTER OF G.W. SPINDLE (REAL) |
| 12.8182 | ;Y DISTANCE FROM HOME TO CENTER OF G.W. SPINDLE (REAL) |
| 35 | ;CUTTING SPEED (INTEGER) |
| 3.0 | ;STARTING ANGLE FOR NON-ENDCUTTING FLUTES (REAL-DEGREES) |
| 1.8 | ;Z AXIS INCREMENT BETWEEN POINTS (REAL-DEGREES) |
| 0.25 | ;PERCENTAGE OF DEPTH RUNOUT FOR ENDCUTTING FLUTES (REAL) |
| 39.438 | ;Z AXIS HOME OFFSET (REAL) |
| 69.62 | ;A AXIS HOME OFFSET (REAL) |

APPENDIX D

Example Generic ANORAD Program Listing: STWORAD

```
G69 [ 13 ]
  M104
N1 V2=0 V3=0 V7=0
  Z0A0B0 F1000
  G58"V1= "V1F5.3" V2= "V2F2.0" V3= "V3F2.0" V4= "V4F5.3" V5= "V5F5.3" V6= "V6F5.3" V7= "V7F2.0
  M0
  G58"V1= "V1F5.3" V2= "V2F2.0" V3= "V3F2.0" V4= "V4F5.3" V5= "V5F5.3" V6= "V6F5.3" V7= "V7F2.0
  M100M102M105
  JV7N10
```

```
   V8=V2

B0 F1000

G70G90G92X0Y0Z0M98F1000

V28=[ 8 ]+[ 39 ]

V11=Q7(((((V1)/2)+[ 38 ])**2+[ 36 ]-(((V1)**2)/4))/([ 37 ]*(((V1)/2)+[ 38 ])))+(V4*P/180)+[ 39 ]

N2 V28=V28+[ 9 ] JV11-V28N2

V11=[ 8 ]+[ 39 ]

JV2N4

N3 X[ 4 ]Y[ 3 ]Z-90

G5

G61 3 N021

X-11.885 F30

G5

G58"ERROR -- BUR IS LOADED TOO SHORT"

G61 -1 M7 JN23

N24 G4X.1

J5.45-V1N22

V10=X-([ 2 ])+V6 V22=[ 4 ]-X V23=[ 7 ]-(V1/2) V24=90

M7 JN5

N4 V19=0 V22=[ 4 ] V23=[ 5 ]-(V1/2) V24=0

JV10N5

G58"ERROR -- NO TOOL LENGTH"

JN3

N5 V12=[ 40 ] V13=V11-[ 9 ] V15=0 V16=0 V17=1 V18=1 V19=0 V25=[ 20 ]*(([ 26 ]*S(V28))+([ 24 ])) V26=V12-[ 9 ]

J[ 40 ]-V28N26

V25=[ 20 ]*(([ 30 ]*S(V28))+([ 28 ]))

N26 M98 G92XV22YV23ZV24

V50=-.125-((V10+[ 25 ])*S(-V11))-(([ 24 ])*Q4(-V11)) V125=-(((V10+[ 25 ])*Q4(-V11))-(([ 24 ])*S(-V11))+[ 26 ]+.125)

V200=-V11*180/P

V425=-.125-((V10+[ 25 ])*S(-V28))-(([ 24 ])*Q4(-V28)) V500=-(((V10+[ 25 ])*Q4(-V28))-(([ 24 ])*S(-V28))+[ 26 ]+.125)

V575=-V28*180/P V650=0 V725=0 V29=0

N32 V13=V13+[ 9 ] V19=V19+1 V(V19+50)=-((V10+[ 25 ])*S(-V13))-(([ 24 ])*Q4(-V13))
```

V(V19+125)=-(((V10+([ 25 ]))*Q4(-V13))-(([ 24 ])*S(-V13))+[ 26 ]-([ 46 ]*([ 26 ]*S(V13)+([ 24 ])))) V(V19+200)=-V13*180/P

JV28-V13N6

V(V19+425)=-((V10+([ 25 ]))*S(-V13))-(([ 24 ])*Q4(-V13))

V(V19+500)=-(((V10+([ 25 ]))*Q4(-V13))-(([ 24 ])*S(-V13))+[ 27 ]+((1.5708-V13)*[ 11 ]/(1.5708-V28))) V(V19+575)=-V13*180/P

V(V19+650)=([ 20 ]*(([ 26 ]*S(V13))+([ 24 ])))-(V25*(1.5708-V13)/(1.5708-V28))

V(V19+725)=V(V19+724)+((Q5(V(V19+650)*P/180)*180/P)*([ 26 ]*(Q4(V13)-Q4(V13-[ 9 ])))/([ 26 ]*S(V13)+([ 24 ])))

JN7

N6 V29=V29+1 V(V19+650)=0 V(V19+725)=0

N7 JV26-V13N32 V12=1.5708 V13=V13+[ 9 ] V19=V19+1 V26=V12-[ 9 ] V(V19+50)=-((V10+([ 29 ]))*S(-V13))-(([ 28 ])*Q4(-V13))

V(V19+125)=-(((V10+([ 29 ]))*Q4(-V13))-(([ 28 ])*S(-V13))+[ 30 ]-([ 46 ]*([ 30 ]*S(V13)+([ 28 ])))) V(V19+200)=-V13*180/P

JV28-V13N27

V(V19+425)=V(V19+50) V(V19+575)=V(V19+200)

V(V19+500)=-(((V10+([ 29 ]))*Q4(-V13))-(([ 28 ])*S(-V13))+[ 31 ]+((1.5708-V13)*[ 11 ]/(1.5708-V28)))

V(V19+650)=([ 20 ]*(([ 30 ]*S(V13))+([ 28 ])))-(V25*(1.5708-V13)/(1.5708-V28)) V27=Q5(V(V19+650)*P/180)*180/P

V(V19+725)=V(V19+724)+(V27*((([ 30 ]*Q4(V13))+([ 29 ]))-(([ 26 ]*Q4(V13-[ 9 ]))+([ 25 ])))/(([ 30 ]*S(V13))+([ 28 ])))

JN33

N27 V29=V29+1 V(V19+650)=0 V(V19+725)=0

N33 V13=V13+[ 9 ] V19=V19+1 V(V19+50)=-((V10+([ 29 ]))*S(-V13))-(([ 28 ])*Q4(-V13))

V(V19+125)=-(((V10+([ 29 ]))*Q4(-V13))-(([ 28 ])*S(-V13))+[ 30 ]-([ 46 ]*([ 30 ]*S(V13)+([ 28 ])))) V(V19+200)=-V13*180/P

JV28-V13N28

V(V19+425)=V(V19+50) V(V19+575)=V(V19+200)

V(V19+500)=-(((V10+([ 29 ]))*Q4(-V13))-(([ 28 ])*S(-V13))+[ 31 ]+((1.5708-V13)*[ 11 ]/(1.5708-V28)))

V(V19+650)=([ 20 ]*(([ 30 ]*S(V13))+([ 28 ])))-(V25*(1.5708-V13)/(1.5708-V28))

V(V19+725)=V(V19+724)+((Q5(V(V19+650)*P/180)*180/P)*([ 30 ]*(Q4(V13)-Q4(V13-[ 9 ])))/([ 30 ]*S(V13)+([ 28 ])))

JN29

N28 V29=V29+1 V(V19+650)=0 V(V19+725)=0

N29 JV26-V13N33 V12=[ 41 ]+(V5*P/180)

V13=V13+[ 9 ] V19=V19+1 V(V19+50)=-((V10+([ 29 ]))*S(-V13))-(([ 28 ])*Q4(-V13))

V(V19+125)=-(((V10+([ 29 ]))*Q4(-V13))-(([ 28 ])*S(-V13))+[ 30 ]-([ 46 ]*([ 30 ]*S(V13)+([ 28 ])))) V(V19+200)=-V13*180/P

V(V19+425)=V(V19+50) V(V19+500)=V(V19+125) V(V19+575)=V(V19+200)

V(V19+650)=[ 48 ] V(V19+725)=V(V19+724)+((Q5(V(V19+650)*P/180)*180/P)*([ 30 ]*(Q4(V13)-Q4(V13-[ 9 ])))/([ 30 ]*S(V13)+([ 28 ])))

N34 V13=V13+[ 10 ] V19=V19+1 V(V19+50)=-((V10+([ 29 ]))*S(-V13))-(([ 28 ])*Q4(-V13))

V(V19+125)=-(((V10+([ 29 ]))*Q4(-V13))-(([ 28 ])*S(-V13))+[ 30 ]-([ 46 ]*([ 30 ]*S(V13)+([ 28 ]))))

V(V19+200)=-V13*180/P V(V19+650)=V(V19+649)

V(V19+725)=V(V19+724)+((Q5(V(V19+650)*P/180)*180/P)*([ 30 ]*(Q4(V13)-Q4(V13-[ 10 ])))/([ 30 ]*S(V13)+([ 28 ])))

V(V19+425)=V(V19+50) V(V19+500)=V(V19+125) V(V19+575)=V(V19+200)

JV12-V13N34 V19=V19+1

V(V19+50)=V(V19+49) V(V19+125)=V(V19+124) V(V19+200)=V(V19+199)-1

V(V19+425)=V(V19+50) V(V19+500)=V(V19+125) V(V19+575)=V(V19+200) V(V19+650)=V(V19+649) V(V19+725)=V(V19+724)

V20=V19 V21=V20+1

JV2N10

XV50 F1000

N10 V19=0

N11 V(V19+725)=V(V19+725)+V15 V19=V19+1 JV21-V19N11

JV18N13

V14=375 V30=5

JV17N12

V19=V29+1 JN14

N12 V19=V29+3 JN14

N13 V14=0 V30=15 V19=1

N14 YV(V14+125) F1000

ZV(V14+200)

XV(V14+50)AV650BV(V19+725)

FV30 G9

XV(V14+V19+50)YV(V14+V19+125)ZV(V14+V19+200)AV(V19+650)BV(V19+725)

V19=V19+1

F[ 12 ]

JV14N31

N30 XV(V19+50)YV(V19+125)ZV(V19+200)AV(V19+650)BV(V19+725) V19=V19+1 JV21-V19N30 GO JN15

N31 XV(V19+425)YV(V19+500)ZV(V19+575)AV(V19+650)BV(V19+725) V19=V19+1 JV21-V19N31 GO

N15 G5 V15=360/[ 14 ] V16=V16+1 V17=((V16+1)/[ 17 ])-T((V16+1)/[ 17 ]) V18=((V16+1)/[ 16 ])-T((V16+1)/[ 16 ])

G58"FINISHED"V16F3.0" STANDARD FLUTES OF [ 14 ]"

JV3N16

J[ 14 ]-V16N10

JN17

N16 JV3-V16N10

JN25

N17 V13=V28-[ 9 ] V15=0 V16=0 V19=0

JV28-[ 40 ]N48

V12=[ 40 ] V26=V12-[ 9 ] V50=-.125-((V10+([ 25 ]))*S(-V28))-(([ 24 ])*Q4(-V28))

V125=-(((V10+([ 25 ]))*Q4(-V28))-(([ 24 ])*S(-V28))+[ 26 ]+.125) V200=-V28*180/P

V(V19+275)=[ 21 ]*(([ 26 ]*S(V28))+([ 24 ])) V(V19+350)=[ 23 ]*(([ 26 ]*Q4(V28))+([ 25 ]))

N42 V13=V13+[ 9 ] V19=V19+1 V(V19+50)=-((V10+([ 25 ]))*S(-V13))-(([ 24 ])*Q4(-V13))

V(V19+125)=-(((V10+([ 25 ]))*Q4(-V13))-(([ 24 ])*S(-V13))+[ 26 ]-([ 46 ]*([ 26 ]*S(V13)+([ 24 ])))) V(V19+200)=-V13*180/P

V(V19+275)=[ 21 ]*(([ 26 ]*S(V13))+([ 24 ])) V(V19+350)=[ 23 ]*(([ 26 ]*Q4(V13))+([ 25 ]))

JV26-V13N42

JN49

N48 V50=-.125-((V10+([ 29 ]))*S(-V28))-(([ 28 ])*Q4(-V28))

V125=-(((V10+([ 29 ]))*Q4(-V28))-(([ 28 ])*S(-V28))+[ 30 ]+.125) V200=-V28*180/P

V(V19+275)=[ 21 ]*(([ 30 ]*S(V28))+([ 28 ])) V(V19+350)=[ 23 ]*(([ 30 ]*Q4(V28))+([ 29 ]))

N49 V12=1.5708 V13=V13+[ 9 ] V19=V19+1 V26=V12-[ 9 ]

V(V19+50)=-((V10+([ 29 ]))*S(-V13))-(([ 28 ])*Q4(-V13))

V(V19+125)=-(((V10+([ 29 ]))*Q4(-V13))-(([ 28 ])*S(-V13))+[ 30 ]-([ 46 ]*([

```
           30 ]*S(V13)+([ 28 ])))) V(V19+200)=-V13*180/P

V(V19+275)=[ 21 ]*(([ 30 ]*S(V13))+([ 28 ])) V(V19+350)=[ 23 ]*(([ 30
]*Q4(V13))+([ 29 ]))

N43 V13=V13+[ 9 ] V19=V19+1 V(V19+50)=-((V10+([ 29 ]))*S(-V13))-(([ 28 ])*Q4(-
V13))

V(V19+125)=-(((V10+([ 29 ]))*Q4(-V13))-(([ 28 ])*S(-V13))+[ 30 ]-([ 46 ]*([
30 ]*S(V13)+([ 28 ])))) V(V19+200)=-V13*180/P

V(V19+275)=[ 21 ]*(([ 30 ]*S(V13))+([ 28 ])) V(V19+350)=[ 23 ]*(([ 30
]*Q4(V13))+([ 29 ]))

JV26-V13N43 V12=[ 41 ]-.08727+(V5*P/180)

V13=V13+[ 9 ] V19=V19+1 V(V19+50)=-((V10+([ 29 ]))*S(-V13))-(([ 28 ])*Q4(-
V13))

V(V19+125)=-(((V10+([ 29 ]))*Q4(-V13))-(([ 28 ])*S(-V13))+[ 30 ]-([ 46 ]*([
30 ]*S(V13)+([ 28 ])))) V(V19+200)=-V13*180/P

V(V19+275)=[ 49 ]

V(V19+350)=V(V19+349)+((Q5(V(V19+275)*P/180)*180/P)*([ 30 ]*(Q4(V13)-
Q4(V13-[ 9 ])))/([ 30 ]*S(V13)+([ 28 ])))

N44 V13=V13+[ 10 ] V19=V19+1 V(V19+50)=-((V10+([ 29 ]))*S(-V13))-(([ 28
])*Q4(-V13))

V(V19+125)=-(((V10+([ 29 ]))*Q4(-V13))-(([ 28 ])*S(-V13))+[ 30 ]-([ 46 ]*([
30 ]*S(V13)+([ 28 ]))))

V(V19+200)=-V13*180/P V(V19+275)=V(V19+274)

V(V19+350)=V(V19+349)+((Q5(V(V19+275)*P/180)*180/P)*([ 30 ]*(Q4(V13)-
Q4(V13-[ 10 ])))/([ 30 ]*S(V13)+([ 28 ])))

JV12-V13N44 V19=V19+1

V(V19+50)=V(V19+49)V(V19+125)=V(V19+124)V(V19+200)=V(V19+199)-1 V(V19+275
)=V(V19+274) V(V19+350)=V(V19+349)

V20=V19 V21=V20+1

N18 V19=0

N19 V(V19+350)=V(V19+350)+V15 V19=V19+1 JV21-V19N19

YV125 F1000

ZV200

XV50AV275BV350

V19=1 F15 G9

XV(V19+50)YV(V19+125)ZV(V19+200)AV(V19+275)BV(V19+350) V19=V19+1

F[ 12 ]

N40 XV(V19+50)YV(V19+125)ZV(V19+200)AV(V19+275)BV(V19+350) V19=V19+1 JV21-
```

```
V19N40 G0

G5 V15=360/[ 15 ] V16=V16+1

G58"FINISHED"V16F3.0" SECONDARY FLUTES OF [ 15 ]"

J[ 15 ]-V16N18

N25 JV8+V7N21

V23=V23+[ 3 ]

N21 Y-V23 F1000

X-([ 4 ])

Z0A0B0

G66 32786 240 R300

M103M104

JN1

N22 G58"ERROR -- BAD WHEEL DIAMETER"

N23 M99YM99XM99Y

Z0A0B0 F1000

M0

JN1

N10006 M99YM99XM99

G4X1

M98

F1000Z[ 0 ]A[ 1 ]

G4X1

M98M6
```

APPENDIX E

Example ANORAD Program Listing: 440625.310

```
G69 440625310

M104

N1 V2=0 V3=0 V7=0

Z0A0B0 F1000

G58"V1= "V1F5.3" V2= "V2F2.0" V3= "V3F2.0" V4= "V4F5.3" V5= "V5F5.3" V6= "V6F5.3" V7= "V7F2.0

M0

G58"V1= "V1F5.3" V2= "V2F2.0" V3= "V3F2.0" V4= "V4F5.3" V5= "V5F5.3" V6= "V6F5.3" V7= "V7F2.0

M100M102M105

JV7N10

V8=V2

B0 F1000
```

```
G70G90G92X0Y0Z0M98F1000

V28=   0.0524+  0.0000

V11=Q7(((((V1)/2)* 0.2085)**2+ 0.0613-(((V1)**2)/4))/(  0.4950*(((V1)/2)
+  0.2085)))+(V4*P/180)+  0.0000

N2 V28=V28+  0.0314 JV11-V28N2

V11=  0.0524+  0.0000

JV2N4

N3 X -8.8770Y  4.7714Z-90

G5

G61 3 N021

X-11.885 F30

G5

G58"ERROR -- BUR IS LOADED TOO SHORT"

G61 -1 M7 JN23

N24 G4X.1

J5.45-V1N22

V10=X-( -14.4112)+V6 V22= -8.8770-X V23=  8.0468-(V1/2) V24=90

M7 JN5

N4 V19=0 V22= -8.8770 V23=  12.8182-(V1/2) V24=0

JV10N5

G58"ERROR -- NO TOOL LENGTH"

JN3

N5 V12=  1.2083 V13=V11-  0.0314 V15=0 V16=0 V17=1 V18=1 V19=0 V25= -80.0000*
((  0.2475*S(V28))+(  0.0000)) V26=V12-  0.0314

J  1.2083-V28N26

V25= -80.0000*((  1.2475*S(V28))+(  -0.9350))

N26 M98 G92XV22YV23ZV24

V50=-.125-((V10+(  -0.2475))*S(-V11))-((  0.0000)*Q4(-V11)) V125=-(((V10+(
-0.2475))*Q4(-V11))-((  0.0000)*S(-V11))+  0.2475+.125)

V200=-V11*180/P

V425=-.125-((V10+(  -0.2475))*S(-V28))-((  0.0000)*Q4(-V28)) V500=-(((V10+(
-0.2475))*Q4(-V28))-((  0.0000)*S(-V28))+  0.2475+.125)

V575=-V28*180/P V650=0 V725=0 V29=0

N32 V13=V13+  0.0314 V19=V19+1 V(V19+50)=-((V10+(  -0.2475))*S(-V13))-((  0.00
00)*Q4(-V13))

V(V19+125)=-(((V10+(  -0.2475))*Q4(-V13))-((  0.0000)*S(-V13))+  0.2475-(
0.1366*(  0.2475*S(V13)+(  0.0000)))) V(V19+200)=-V13*180/P

JV28-V13N6
```

```
    V(V19+425)=-((V10+( -0.2475))*S(-V13))-(( 0.0000)*Q4(-V13))

V(V19+500)=-(((V10+( -0.2475))*Q4(-V13))-(( 0.0000)*S(-V13))+ 0.1955+((
1.5708-V13)* 0.0130/(1.5708-V28))) V(V19+575)=-V13*180/P

V(V19+650)=( -80.0000*(( 0.2475*S(V13))+( 0.0000)))-(V25*(1.5708-V13)/(
1.5708-V28))

V(V19+725)=V(V19+724)+((Q5(V(V19+650)*P/180)*180/P)*( 0.2475*(Q4(V13)-Q4(
V13- 0.0314)))/( 0.2475*S(V13)+( 0.0000)))

JN7

N6 V29=V29+1 V(V19+650)=0 V(V19+725)=0

N7 JV26-V13N32 V12=1.5708 V13=V13+ 0.0314 V19=V19+1 V26=V12- 0.0314

V(V19+50)=-((V10+( -0.6021))*S(-V13))-(( -0.9350)*Q4(-V13))

V(V19+125)=-(((V10+( -0.6021))*Q4(-V13))-(( -0.9350)*S(-V13))+ 1.2475-(
0.1366*( 1.2475*S(V13)+( -0.9350)))) V(V19+200)=-V13*180/P

JV28-V13N27

V(V19+425)=V(V19+50) V(V19+575)=V(V19+200)

V(V19+500)=-(((V10+( -0.6021))*Q4(-V13))-(( -0.9350)*S(-V13))+ 1.1955+((
1.5708-V13)* 0.0130/(1.5708-V28)))

V(V19+650)=( -80.0000*(( 1.2475*S(V13))+( -0.9350)))-(V25*(1.5708-V13)/(
1.5708-V28)) V27=Q5(V(V19+650)*P/180)*180/P

V(V19+725)=V(V19+724)+(V27*((( 1.2475*Q4(V13))+( -0.6021))-(( 0.2475*Q4(
V13- 0.0314))+( -0.2475)))/(( 1.2475*S(V13))+( -0.9350)))

JN33

N27 V29=V29+1 V(V19+650)=0 V(V19+725)=0

N33 V13=V13+ 0.0314 V19=V19+1 V(V19+50)=-((V10+( -0.6021))*S(-V13))-(( -0.93
50)*Q4(-V13))

V(V19+125)=-(((V10+( -0.6021))*Q4(-V13))-(( -0.9350)*S(-V13))+ 1.2475-(
0.1366*( 1.2475*S(V13)+( -0.9350)))) V(V19+200)=-V13*180/P

JV28-V13N28

V(V19+425)=V(V19+50) V(V19+575)=V(V19+200)

V(V19+500)=-(((V10+( -0.6021))*Q4(-V13))-(( -0.9350)*S(-V13))+ 1.1955+((
1.5708-V13)* 0.0130/(1.5708-V28)))

V(V19+650)=( -80.0000*(( 1.2475*S(V13))+( -0.9350)))-(V25*(1.5708-V13)/(
1.5708-V28))

V(V19+725)=V(V19+724)+((Q5(V(V19+650)*P/180)*180/P)*( 1.2475*(Q4(V13)-Q4(
V13- 0.0314)))/( 1.2475*S(V13)+( -0.9350)))

JN29

N28 V29=V29+1 V(V19+650)=0 V(V19+725)=0

N29 JV26-V13N33 V12= 1.8850+(V5*P/180)
```

V13=V13+ 0.0314 V19=V19+1 V(V19+50)=-((V10+( -0.6021))*S(-V13))-(( -0.93
50)*Q4(-V13))

V(V19+125)=-(((V10+( -0.6021))*Q4(-V13))-(( -0.9350)*S(-V13))+ 1.2475-(
0.1366*( 1.2475*S(V13)+( -0.9350)))) V(V19+200)=-V13*180/P

V(V19+425)=V(V19+50) V(V19+500)=V(V19+125) V(V19+575)=V(V19+200)

V(V19+650)= -25.0000 V(V19+725)=V(V19+724)+((Q5(V(V19+650)*P/180)*180/P)*(
1.2475*(Q4(V13)-Q4(V13- 0.0314)))/( 1.2475*S(V13)+( -0.9350)))

N34 V13=V13+ 0.0275 V19=V19+1 V(V19+50)=-((V10+( -0.6021))*S(-V13))-(( -0.93
50)*Q4(-V13))

V(V19+125)=-(((V10+( -0.6021))*Q4(-V13))-(( -0.9350)*S(-V13))+ 1.2475-(
0.1366*( 1.2475*S(V13)+( -0.9350))))

V(V19+200)=-V13*180/P V(V19+650)=V(V19+649)

V(V19+725)=V(V19+724)+((Q5(V(V19+650)*P/180)*180/P)*( 1.2475*(Q4(V13)-Q4(
V13- 0.0275)))/( 1.2475*S(V13)+( -0.9350)))

V(V19+425)=V(V19+50) V(V19+500)=V(V19+125) V(V19+575)=V(V19+200)

JV12-V13N34 V19=V19+1

V(V19+50)=V(V19+49) V(V19+125)=V(V19+124) V(V19+200)=V(V19+199)-1

V(V19+425)=V(V19+50) V(V19+500)=V(V19+125) V(V19+575)=V(V19+200) V(V19+650
)=V(V19+649) V(V19+725)=V(V19+724)

V20=V19 V21=V20+1

JV2N10

XV50 F1000

N10 V19=0

N11 V(V19+725)=V(V19+725)+V15 V19=V19+1 JV21-V19N11

JV18N13

V14=375 V30=5

JV17N12

V19=V29+1 JN14

N12 V19=V29+3 JN14

N13 V14=0 V30=15 V19=1

N14 YV(V14+125) F1000

ZV(V14+200)

XV(V14+50)AV650BV(V19+725)

FV30 G9

XV(V14+V19+50)YV(V14+V19+125)ZV(V14+V19+200)AV(V19+650)BV(V19+725) V19=V19
+1

F 35

JV14N31

N30 XV(V19+50)YV(V19+125)ZV(V19+200)AV(V19+650)BV(V19+725) V19=V19+1 JV21-V19

N30 G0 JN15

N31 XV(V19+425)YV(V19+500)ZV(V19+575)AV(V19+650)BV(V19+725) V19=V19+1 JV21-V1

9N31 G0

N15 G5 V15=360/24 V16=V16+1 V17=((V16+1)/ 12.0)-T((V16+1)/ 12.0) V18=((V16+

1)/ 6.0)-T((V16+1)/ 6.0)

G58"FINISHED"V16F3.0" STANDARD FLUTES OF 24"

JV3N16

J24-V16N10

JN17

N16 JV3-V16N10

JN25

N17 V13=V28- 0.0314 V15=0 V16=0 V19=0

JV28- 1.2083N48

V12= 1.2083 V26=V12- 0.0314 V50=-.125-((V10+( -0.2475))*S(-V28))-(( 0.0000)*Q4(-V28))

V125=-(((V10+( -0.2475))*Q4(-V28))-(( 0.0000)*S(-V28))+ 0.2475+.125)

V200=-V28*180/P

V(V19+275)= 64.0000*(( 0.2475*S(V28))+( 0.0000)) V(V19+350)= 66.7326*( ( 0.2475*Q4(V28))+( -0.2475))

N42 V13=V13+ 0.0314 V19=V19+1 V(V19+50)=-((V10+( -0.2475))*S(-V13))-(( 0.0000)*Q4(-V13))

V(V19+125)=-(((V10+( -0.2475))*Q4(-V13))-(( 0.0000)*S(-V13))+ 0.2475-( 0.1366*( 0.2475*S(V13)+( 0.0000)))) V(V19+200)=-V13*180/P

V(V19+275)= 64.0000*(( 0.2475*S(V13))+( 0.0000)) V(V19+350)= 66.7326*( ( 0.2475*Q4(V13))+( -0.2475))

JV26-V13N42

JN49

N48 V50=-.125-((V10+( -0.6021))*S(-V28))-(( -0.9350)*Q4(-V28))

V125=-(((V10+( -0.6021))*Q4(-V28))-(( -0.9350)*S(-V28))+ 1.2475+.125)

V200=-V28*180/P

V(V19+275)= 64.0000*(( 1.2475*S(V28))+( -0.9350)) V(V19+350)= 66.7326*( ( 1.2475*Q4(V28))+( -0.6021))

N49 V12=1.5708 V13=V13+ 0.0314 V19=V19+1 V26=V12- 0.0314

V(V19+50)=-((V10+( -0.6021))*S(-V13))-(( -0.9350)*Q4(-V13))

V(V19+125)=-(((V10+( -0.6021))*Q4(-V13))-(( -0.9350)*S(-V13))+ 1.2475-( 0.1366*( 1.2475*S(V13)+( -0.9350)))) V(V19+200)=-V13*180/P

V(V19+275)= 64.0000*(( 1.2475*S(V13))+( -0.9350)) V(V19+350)= 66.7326*( ( 1.2475*Q4(V13))+( -0.6021))

N43 V13=V13+ 0.0314 V19=V19+1 V(V19+50)=-((V10+( -0.6021))*S(-V13))-(( -0.9350)*Q4(-V13))

V(V19+125)=-(((V10+( -0.6021))*Q4(-V13))-(( -0.9350)*S(-V13))+ 1.2475-( 0.1366*( 1.2475*S(V13)+( -0.9350)))) V(V19+200)=-V13*180/P

V(V19+275)= 64.0000*(( 1.2475*S(V13))+( -0.9350)) V(V19+350)= 66.7326*( ( 1.2475*Q4(V13))+( -0.6021))

JV26-V13N43 V12= 1.8850-.08727+(V5*P/180)

V13=V13+ 0.0314V19=V19+1V(V19+50)=-((V10+(-0.6021))*S(-V13))-(( -0.9350)*Q4(-V13))

V(V19+125)=-(((V10+( -0.6021))*Q4(-V13))-(( -0.9350)*S(-V13))+ 1.2475-( 0.1366*( 1.2475*S(V13)+( -0.9350)))) V(V19+200)=-V13*180/P

V(V19+275)= 20.0000

V(V19+350)=V(V19+349)+((Q5(V(V19+275)*P/180)*180/P)*( 1.2475*(Q4(V13)-Q4( V13- 0.0314)))/( 1.2475*S(V13)+( -0.9350)))

N44 V13=V13+ 0.0275 V19=V19+1 V(V19+50)=-((V10+( -0.6021))*S(-V13))-(( -0.9350)*Q4(-V13))

V(V19+125)=-(((V10+( -0.6021))*Q4(-V13))-(( -0.9350)*S(-V13))+ 1.2475-( 0.1366*( 1.2475*S(V13)+( -0.9350))))

V(V19+200)=-V13*180/P V(V19+275)=V(V19+274)

V(V19+350)=V(V19+349)+((Q5(V(V19+275)*P/180)*180/P)*( 1.2475*(Q4(V13)-Q4( V13- 0.0275)))/( 1.2475*S(V13)+( -0.9350)))

JV12-V13N44 V19=V19+1

V(V19+50)=V(V19+49) V(V19+125)=V(V19+124) V(V19+200)=V(V19+199)-1 V(V19+275)=V(V19+274) V(V19+350)=V(V19+349)

V20=V19 V21=V20+1

N18 V19=0

N19 V(V19+350)=V(V19+350)+V15 V19=V19+1 JV21-V19N19

YV125 F1000

ZV200

XV50AV275BV350

V19=1 F15 G9

XV(V19+50)YV(V19+125)ZV(V19+200)AV(V19+275)BV(V19+350) V19=V19+1

F 35

N40 XV(V19+50)YV(V19+125)ZV(V19+200)AV(V19+275)BV(V19+350) V19=V19+1 JV21-V19 N40 G0

G5 V15=360/17 V16=V16+1

G58"FINISHED"V16F3.0" SECONDARY FLUTES OF 17"

J17-V16N18

```
N25 JV8+V7N21

V23=V23+  4.7714

N21 Y-V23 F1000

X-( -8.8770)

Z0A0B0

G66 32786 240 R300

M103M104

JN1

N22 G58"ERROR -- BAD WHEEL DIAMETER"

N23 M99YM99XM99Y

Z0A0B0 F1000

M0

JN1

N10006 M99YM99XM99

G4X1

M98

F1000Z  39.4380A  69.6200

G4X1

M98M6
```

APPENDIX G

Program Generator Source Code

```
{ copyright 1982, 1983 Tungsten Industries }

PROGRAM BURR;

LABEL
    1,2,3,4,5;

CONST
    PI = 3.14159;

TYPE
    FILENAME = STRING 14;

$STRING0 = STRING 0;

$STRING1 = STRING 1;

$STRING255 = STRING 255;

CUT = '0'..'9';
```

```
      GRIND = '0'..'9';

SHANK = '0'..'9';

VARCASE = 0..53;

VAR

OPTCUT : CUT;

OPTGRIND : GRIND;

OPTSHANK : SHANK;

VARLABEL : VARCASE;

INFILE : TEXT;

CATNO : STRING 6;

EDPNUM,EDPOPEN,CNCBASE : STRING 14;

DESCRIPT : STRING 30;

ACHAR : CHAR;

ENDCUT,I,NOFLT,SNOFLT,FEED,NOEC,SNOEC : INTEGER;

LISTFLAG,EDFLAG,OPTERROR,FLAG,EDPFOUND : BOOLEAN;

DEPTH,HELIX,SDEPTH,SHELIX,AC,BC,SAC,SBC,HTOPX,HTOPY,HTOSX,HTOSY,START,MO1,
      NO1,R1,MO2,NO2,R2,MO3,NO3,R3,INCR,PEREC,OFFSETZ,OFFSETA,SA1,FA1,FA2,
      FA3,DIA,LEN,ANG,DHELIX,ED : REAL;

PROCEDURE SIGNON;

{ copyright 1982, 1983 Tungsten Industries }

BEGIN
   FOR I := 1 TO 16 DO WRITELN;
   WRITELN('                        Tungsten Industries');
   WRITELN;
   WRITELN('                   Computer-aided Part Programming');
   WRITELN;
   WRITELN('                             Version 1.0');
   WRITELN('                Copyright 1982, 1983 Tungsten Industries');
   FOR I := 1 TO 4 DO WRITELN;
   WRITELN('                             developed by');
   WRITELN('                   Department of Engineering Technology');
   WRITELN('                           Clemson University');
   WRITELN('                                1983');
   WRITELN;WRITELN;WRITELN;
```

```
FOR I:= 1 TO 15000 DO NOFLT:= 0;

FOR I:= 1 TO 24 DO WRITELN;

WRITELN('Programming notes:');

WRITE('  To program a standard burr enter only the full 9-digit EDP ');

WRITELN('number for that');

WRITE('burr.  Special burrs require a "S" for the second digit.  The  ');

WRITELN('burr profile is');

WRITE('all that can be programmed to define a burr.  The end cut style, ');

WRITELN('depth of cut,');

WRITE('number of flutes, etc. are all automatically defined by this ');

WRITELN('program.  The');

WRITE('type of input required by each question is specified at the end ');

WRITELN('of each');

WRITE('question. All character inputs must be in upper case.  All real ');

WRITELN('inputs must');

WRITE('be left justified (i.e. 0.3125 or 1).  Output files will be dumped');

WRITELN(' on the "B:"');

WRITE('drive under the following format:<type and size digits>.<option ');

WRITELN('select digits>');

WRITELN;WRITELN('                       *** WARNING ***');

WRITE('   All first runs of a burr size and type should be tried out ');

WRITELN('by cutting air,');

WRITE('preferably with a worn out grinding wheel mounted.  Extreme care ');

WRITELN('should be used');

WRITE('in verifying the stopping angle of the grinding pass, especially ');

WRITELN('when grinding');

WRITE('a burr with a reverse taper at the shank.  Loading position and ');

WRITELN('finishing angle');

WRITE('should be set as required.  The base data file "BURRBLOK" of burr ');

WRITELN('geometries');

WRITE('has been based upon cutting across the entire blank.  If physical ');

WRITELN('constraints');

WRITE('prohibit this, the data base should be modified using "EDIT".  Be ');

WRITELN('sure that');

WRITE('up-to-date numbers are in the "MACHDATA" file.  Failure to ');

WRITELN('exercise caution');

WRITE('could result in damage to the tool spindle and loss of the ');

WRITELN('grinding wheel.');WRITELN

END;
```

{ copyright 1982, 1983 Tungsten Industries }

```
FUNCTION ERASE(OLDFILEN:FILENAME):BOOLEAN;EXTERNAL;

FUNCTION RENAME(OLDFILEN,NEWFILEN:FILENAME):BOOLEAN;EXTERNAL;

FUNCTION LENGTH(X:$STRING255):INTEGER;EXTERNAL;

PROCEDURE SETLENGTH( VAR X: $STRING0; Y: INTEGER ); EXTERNAL;

PROCEDURE LISTDATA;

{ copyright 1982, 1983 Tungsten Industries }

VAR
   INFILE : TEXT;

BEGIN
   WRITELN;
   WRITELN('NOTE -- burr data may not be in order.');
   FOR I:= 1 TO 5000 DO NOFLT:= 0;
   LISTFLAG:= FALSE;
   RESET('BURRBLOK',INFILE);
   WHILE (NOT EOF (INFILE)) AND (LISTFLAG = FALSE) DO BEGIN
      FOR I:= 1 TO 24 DO WRITELN;
      WRITELN('Base EDP number         Description');
      WRITELN;
      I:= 0;
      WHILE (I < 18) AND (NOT EOF (INFILE)) DO BEGIN
         READLN(INFILE,CATNO);
         READLN(INFILE);
         READLN(INFILE);
         READLN(INFILE,DESCRIPT);
         WRITELN(CATNO:11,DESCRIPT:40);
         I:= I+1
      END;
      IF EOF (INFILE) THEN BEGIN
         WRITELN;
         WRITELN('That was the last burr.')
      END;
```

```
      WRITELN;
      IF NOT EOF (INFILE) THEN BEGIN
         WRITE('Do you wish to see more?   (Y/N)  ');
         READLN(ACHAR);
         IF ACHAR = 'N' THEN LISTFLAG:= TRUE
         END
      END;
   WRITELN
   END;

PROCEDURE OUTPUT;

{ copyright 1982, 1983 Tungsten Industries  }

VAR
   CNCIN,CNCOUT : TEXT;

BEGIN
   RESET(CNCBASE,CNCIN);
   REWRITE(EDPOPEN,CNCOUT);
   READ(CNCIN,ACHAR);
   WHILE NOT EOF (CNCIN) DO BEGIN
      IF ACHAR = '[' THEN BEGIN
         READ(CNCIN,VARLABEL);
         CASE VARLABEL OF
            0 : WRITE(CNCOUT,OFFSETZ:8:4);
            1 : WRITE(CNCOUT,OFFSETA:8:4);
            2 : WRITE(CNCOUT,HTOPX:8:4);
            3 : WRITE(CNCOUT,HTOPY:8:4);
            4 : WRITE(CNCOUT,HTOSX:8:4);
            5 : WRITE(CNCOUT,HTOSY:8:4);
            6 : WRITE(CNCOUT,(HTOSX-HTOPX):8:4);
            7 : WRITE(CNCOUT,(HTOSY-HTOPY):8:4);
            8 : WRITE(CNCOUT,(START*PI/180.0):8:4);
            9 : WRITE(CNCOUT,(INCR*PI/180.0):8:4);
           10 : WRITE(CNCOUT,(0.875*INCR*PI/180.0):8:4);
           11 : WRITE(CNCOUT,(DEPTH*PEREC):8:4);
           12 : WRITE(CNCOUT,FEED:3);
```

```
13 : WRITE(CNCOUT,EDPNUM:9);
14 : WRITE(CNCOUT,NOFLT:2);
15 : WRITE(CNCOUT,SNOFLT:2);
16 : WRITE(CNCOUT,(NOFLT/4):3:1);
17 : WRITE(CNCOUT,(NOFLT/2):3:1);
18 : WRITE(CNCOUT,DEPTH:8:4);
19 : WRITE(CNCOUT,SDEPTH:8:4);
20 : WRITE(CNCOUT,AC:8:4);
21 : WRITE(CNCOUT,SAC:8:4);
22 : WRITE(CNCOUT,BC:8:4);
23 : WRITE(CNCOUT,SBC:8:4);
24 : WRITE(CNCOUT,NO1:8:4);
25 : WRITE(CNCOUT,MO1:8:4);
26 : WRITE(CNCOUT,R1:8:4);
27 : WRITE(CNCOUT,(R1-DEPTH):8:4);
28 : WRITE(CNCOUT,NO2:8:4);
29 : WRITE(CNCOUT,MO2:8:4);
30 : WRITE(CNCOUT,R2:8:4);
31 : WRITE(CNCOUT,(R2-DEPTH):8:4);
32 : WRITE(CNCOUT,NO3:8:4);
33 : WRITE(CNCOUT,MO3:8:4);
34 : WRITE(CNCOUT,R3:8:4);
35 : WRITE(CNCOUT,(R3-DEPTH):8:4);
36 : WRITE(CNCOUT,(R1*R1):8:4);
37 : WRITE(CNCOUT,(2.0*R1):8:4);
38 : WRITE(CNCOUT,((R1-DEPTH)+(PEREC*DEPTH)):8:4);
39 : WRITE(CNCOUT,SA1:8:4);
40 : WRITE(CNCOUT,FA1:8:4);
41 : WRITE(CNCOUT,FA2:8:4);
42 : WRITE(CNCOUT,FA3:8:4);
43 : WRITE(CNCOUT,(R1-SDEPTH):8:4);
44 : WRITE(CNCOUT,(R2-SDEPTH):8:4);
45 : WRITE(CNCOUT,(R3-SDEPTH):8:4);
46 : WRITE(CNCOUT,(SIN(PI/NOFLT)*COS(HELIX*PI/180.0)*
        1.1547):8:4);
47 : WRITE(CNCOUT,(SIN(PI/SNOFLT)*COS(SHELIX*PI/180.0)*
        1.1547):8:4);
48 : WRITE(CNCOUT,-(HELIX):8:4);
```

```
                49 : WRITE(CNCOUT,SHELIX:8:4);

50 : WRITE(CNCOUT,ANG:8:4);

51 : WRITE(CNCOUT,LEN:8:4);

52 : WRITE(CNCOUT,DIA:8:4);

53 : WRITE(CNCOUT,(ED/2.0):8:4)

END;

READ(CNCIN,ACHAR);

READ(CNCIN,ACHAR)

END

ELSE WRITE(CNCOUT,ACHAR);

IF EOLN (CNCIN) THEN WRITELN(CNCOUT);

READ(CNCIN,ACHAR)

END

END;

PROCEDURE SEARCH;

{  copyright 1982, 1983 Tungsten Industries  }

VAR

TEMP : STRING 6;

INFILE : TEXT;

BEGIN

SETLENGTH(TEMP,0);

EDPFOUND:= FALSE;

RESET('BURRBLOK',INFILE);

FOR I:= 1 TO 6 DO BEGIN

ACHAR:= EDPNUM[I];

APPEND(TEMP,ACHAR)

END;

REPEAT

READLN(INFILE,CATNO);

IF TEMP = CATNO THEN BEGIN

READLN(INFILE,DIA,SA1,MO1,NO1,R1,FA1,MO2,NO2,R2);

READLN(INFILE,FA2,MO3,NO3,R3,FA3,LEN,ANG,ED,HELIX,ENDCUT);

READLN(INFILE,DESCRIPT);

EDPFOUND:= TRUE

END
```

```
            ELSE BEGIN
                READLN(INFILE);
                READLN(INFILE);
                READLN(INFILE)
            END;
        UNTIL EDPFOUND OR EOF (INFILE)
    END;

PROCEDURE SAVESPL;

{ copyright 1982, 1983 Tungsten Industries }

VAR
    INFILE,OUTFILE : TEXT;
    TDIA,TSA1,TM01,TN01,TR1,TFA1,TM02,TN02,TR2,TFA2,TM03,TN03,TR3,TFA3,TLEN,
        TED,THELIX,TANG : REAL;
    TENDCUT : INTEGER;
    TCATNO : STRING 6;
    TDESCRIP : STRING 30;

BEGIN
    WRITE('Please wait ... data file is being modified.  ');
    RESET('BURRBLOK',INFILE);
    REWRITE('TEMP',OUTFILE);
    REPEAT
        READLN(INFILE,TCATNO);
        READLN(INFILE,TDIA,TSA1,TM01,TN01,TR1,TFA1,TM02,TN02,TR2);
        READLN(INFILE,TFA2,TM03,TN03,TR3,TFA3,TLEN,TANG,TED,THELIX,TENDCUT);
        READLN(INFILE,TDESCRIP);
        IF CATNO <> TCATNO THEN BEGIN
            WRITELN(OUTFILE,TCATNO:6);
            WRITE(OUTFILE,TDIA:8:4,TSA1:8:4,TM01:8:4,TN01:8:4,TR1:8:4,TFA1:8:4);
            WRITELN(OUTFILE,TM02:8:4,TN02:8:4,TR2:8:4);
            WRITE(OUTFILE,TFA2:8:4,TM03:8:4,TN03:8:4,TR3:8:4,TFA3:8:4);
            WRITELN(OUTFILE,TLEN:8:4,TANG:8:4,TED:8:4,THELIX:8:4,TENDCUT:3);
            WRITELN(OUTFILE,TDESCRIP:30)
            END;
```

```
UNTIL EOF (INFILE);
WRITELN(OUTFILE,CATNO:6);
WRITE(OUTFILE,DIA:8:4,SA1:8:4,MO1:8:4,NO1:8:4,R1:8:4,FA1:8:4);
WRITELN(OUTFILE,MO2:8:4,NO2:8:4,R2:8:4);
WRITE(OUTFILE,FA2:8:4,MO3:8:4,NO3:8:4,R3:8:4,FA3:8:4);
WRITELN(OUTFILE,LEN:8:4,ANG:8:4,ED:8:4,HELIX:8:4,ENDCUT:3);
WRITELN(OUTFILE,DESCRIPT:30);
WRITELN
END;

PROCEDURE SHOW;

{ copyright 1982, 1983 Tungsten Industries }

LABEL
    1;

VAR
    B,C,T : REAL;

BEGIN
    OPTERROR:= FALSE;
    WRITE('The part description for EDP # ',EDPNUM:9);
    WRITELN(' is  -- ',DESCRIPT:30);
    WRITELN('The maximum diameter is          -- ',DIA:8:4);
    WRITELN('The starting angle is            -- ',SA1:8:4);
    WRITELN('The helix angle is               -- ',HELIX:8:4);
    WRITELN('The M coordinate for r1 is       -- ',MO1:8:4);
    WRITELN('The N coordinate for r1 is       -- ',NO1:8:4);
    WRITELN('The length of r1 is              -- ',R1:8:4);
    WRITELN('The finishing angle of r1 is     -- ',FA1:8:4);
    WRITELN('The M coordinate for r2 is       -- ',MO2:8:4);
    WRITELN('The N coordinate for r2 is       -- ',NO2:8:4);
    WRITELN('The length of r2 is              -- ',R2:8:4);
    WRITELN('The finishing angle of r2 is     -- ',FA2:8:4);
    WRITELN('The M coordinate for r3 is       -- ',MO3:8:4);
    WRITELN('The N coordinate for r3 is       -- ',NO3:8:4);
    WRITELN('The length of r3 is              -- ',R3:8:4);
```

```
WRITELN('The finishing angle of r3 is    -- ',FA3:8:4);
WRITELN('The length of the taper is      -- ',LEN:8:4);
WRITELN('The taper angle is              -- ',ANG:8:4);
WRITELN('The end diameter is             -- ',ED:8:4);
WRITELN('The end cut flag is             -- ',ENDCUT :3);
IF EDFLAG = TRUE THEN GOTO 1;
CASE OPTCUT OF
    '1' : BEGIN
        WRITELN('The cut is medium (standard)');
        B:= 4.46;
        C:= 15.35
        END;
    '2' : BEGIN
        WRITELN('The cut is fine');
        B:= 5.5;
        C:= 18.6
        END;
    '3' : BEGIN
        WRITELN('The cut is course');
        B:= 3.5;
        C:= 13.14
        END;
    '4' : BEGIN
        WRITELN('The cut is aluma');
        B:= 1.74;
        C:= 4.28
        END
    ELSE : BEGIN
            WRITELN('ERROR -- invalid type of cut');
            OPTERROR:= TRUE;
            GOTO 1
            END
    END;
NOFLT:= 4*ROUND(((C*DIA)+B)/2.0);
DEPTH:= (DIA*SIN(PI/NOFLT)*0.57735)/COS(HELIX*PI/180.0);
AC:= -HELIX/(DIA/2.0);
BC:= -((SIN(HELIX*PI/180.0)/COS(HELIX*PI/180.0))/(DIA/2.0))*180.0/PI;
CASE OPTGRIND OF
    '0' : BEGIN
```

```
      WRITELN('The grind is right hand spiral only');
      SHELIX:= 0.0
    END;
'1' : BEGIN
    WRITELN('The grind is double cut');
    SHELIX:= 0.8*HELIX;
    SDEPTH:= DEPTH;
    T:= (1.3333*SDEPTH*COS(SHELIX*PI/180.0))/(DIA*0.57735);
    SNOFLT:= TRUNC(PI/ARCTAN(T/SQRT(1-(T*T))));
    SAC:= SHELIX/(DIA/2.0);
    SBC:= ((SIN(SHELIX*PI/180.0)/COS(SHELIX*PI/180.0))/(DIA/2.0))*57.2958
    END;
'2','3' : BEGIN
    WRITELN('The grind is dymo (diamond) cut');
    SHELIX:= 0.8*HELIX;
    SDEPTH:= DEPTH;
    T:= (SDEPTH*COS(SHELIX*PI/180.0))/(DIA*0.57735);
    SNOFLT:= TRUNC(PI/ARCTAN(T/SQRT(1-(T*T))));
    SAC:= SHELIX/(DIA/2.0);
    SBC:= ((SIN(SHELIX*PI/180.0)/COS(SHELIX*PI/180.0))/(DIA/2.0))*57.2958
    END;
'4' : BEGIN
    WRITELN('The grind is chipbreaker cut');
    SHELIX:= 0.8*HELIX;
    SDEPTH:= 0.7*DEPTH;
    SNOFLT:= 2*ROUND(0.25*NOFLT);
    SAC:= SHELIX/(DIA/2.0);
    SBC:= ((SIN(SHELIX*PI/180.0)/COS(SHELIX*PI/180.0))/(DIA/2.0))*57.2958
    END;
ELSE : BEGIN
         WRITELN('ERROR -- invalid type of grind');
         OPTERROR:= TRUE;
         GOTO 1
         END
  END;
CASE OPTSHANK OF
  '0' : WRITELN('The shank diameter is 1/4"');
  '1' : WRITELN('The shank diameter is 1/8"');
```

```
                '2' : WRITELN('The shank diameter is 3/8"');

'3' : WRITELN('The shank diameter is 3mm');

'4' : WRITELN('The shank diameter is 6mm');

'5' : WRITELN('The shank diameter is 8mm');

'6' : WRITELN('The shank diameter is 10mm');

'7' : WRITELN('The shank diameter is 3/16"');

'8' : WRITELN('The shank diameter is 1/2"');

'9' : BEGIN

WRITELN('ERROR -- invalid size of shank');

OPTERROR:= TRUE

END

END;
    1: END;

PROCEDURE SPECIAL;

{ copyright 1982, 1983 Tungsten Industries }

BEGIN
      WRITE('NOTE -- For graphic descriptions of variables see programming ');
      WRITELN('manual.');
      WRITELN('         If dimensions are not applicable, enter "0".');
      WRITELN; WRITELN;
      SETLENGTH(CATNO,0);
      FOR I:= 1 TO 6 DO BEGIN
         ACHAR:= EDPNUM[I];
         APPEND(CATNO,ACHAR)
      END;
    IF EDFLAG = TRUE THEN WRITELN('The maximum diameter is       -- ',DIA:8:4);
    WRITE('Enter the maximun diameter of the part.      (real)  ');
    READLN(DIA);

IF EDFLAG = TRUE THEN WRITELN('The helix angle is            -- ',HELIX:8:4);
    WRITE('Enter the desired helix angle.       (real-degrees)  ');
    READLN(HELIX);

IF EDFLAG = TRUE THEN WRITELN('The starting angle is         -- ',SA1:8:4);
    WRITE('Enter the starting angle of r1.      (real-radians)  ');
    READLN(SA1);

IF EDFLAG = TRUE THEN WRITELN('The M coordinate for r1 is    -- ',MO1:8:4);
```

```
WRITE('Enter the M coordinate of r1.            (real)  ');

READLN(M01);

IF EDFLAG = TRUE THEN WRITELN('The N coordinate for r1 is   -- ',N01:8:4);

WRITE('Enter the N coordinate of r1.            (real)  ');

READLN(N01);

IF EDFLAG = TRUE THEN WRITELN('The length of r1 is          -- ',R1:8:4);

WRITE('Enter the length of r1.                  (real)  ');

READLN(R1);

IF EDFLAG = TRUE THEN WRITELN('The finishing angle of r1 is -- ',FA1:8:4);

WRITE('Enter the finishing angle of r1.    (real-radians)  ');

READLN(FA1);

IF EDFLAG = TRUE THEN WRITELN('The M coordinate for r2 is   -- ',M02:8:4);

WRITE('Enter the M coordinate of r2.            (real)  ');

READLN(M02);

IF EDFLAG = TRUE THEN WRITELN('The N coordinate for r2 is   -- ',N02:8:4);

WRITE('Enter the N coordinate of r2.            (real)  ');

READLN(N02);

IF EDFLAG = TRUE THEN WRITELN('The length of r2 is          -- ',R2:8:4);

WRITE('Enter the length of r2.                  (real)  ');

READLN(R2);

IF EDFLAG = TRUE THEN WRITELN('The finishing angle of r2 is -- ',FA2:8:4);

WRITE('Enter the finishing angle of r2.    (real-radians)  ');

READLN(FA2);

IF EDFLAG = TRUE THEN WRITELN('The M coordinate for r3 is   -- ',M03:8:4);

WRITE('Enter the M coordinate of r3.            (real)  ');

READLN(M03);

IF EDFLAG = TRUE THEN WRITELN('The N coordinate for r3 is   -- ',N03:8:4);

WRITE('Enter the N coordinate of r3.            (real)  ');

READLN(N03);

IF EDFLAG = TRUE THEN WRITELN('The length of r3 is          -- ',R3:8:4);

WRITE('Enter the length of r3.                  (real)  ');

READLN(R3);

IF EDFLAG = TRUE THEN WRITELN('The finishing angle of r3 is -- ',FA3:8:4);

WRITE('Enter the finishing angle of r3.    (real-radians)  ');

READLN(FA3);

IF EDFLAG = TRUE THEN WRITELN('The length of the taper is   -- ',LEN:8:4);

WRITE('Enter the horizontal length of the taper.   (real)  ');

READLN(LEN);
```

```
IF EDFLAG = TRUE THEN WRITELN('The taper angle is          — ',ANG:8:4);

WRITE('Enter the taper angle.          (real-degrees)  ');

READLN(ANG);

IF EDFLAG = TRUE THEN WRITELN('The end diameter is         — ',ED:8:4);

WRITE('Enter the end diameter.                (real)   ');

READLN(ED);

IF EDFLAG = TRUE THEN WRITELN('The end cut flag is        — ',ENDCUT :3);

WRITE('Enter the end cut flag.                (0/1)   ');

READLN(ENDCUT);

IF EDFLAG = TRUE THEN

WRITELN('The part description is    — ',DESCRIPT:30);

SETLENGTH(DESCRIPT,0);

WRITE('Enter a part description (30 characters maximum)   ');

READLN(DESCRIPT)

END;

PROCEDURE EDIT;

{ copyright 1982, 1983 Tungsten Industries }

LABEL 1,2;

BEGIN

EDFLAG:= TRUE;

1:  SETLENGTH(EDPNUM,0);

WRITE('Enter the first 6 digits of the EDP number.   ');

READLN(EDPNUM);

SEARCH;

IF EDPFOUND = FALSE THEN BEGIN

WRITELN('Base EDP number was not found.');

WRITE('Is this to be a new data entry?    (Y/N)   ');

READLN(ACHAR);

IF ACHAR = 'Y' THEN EDFLAG:= FALSE ELSE GOTO 1

END;

2:  FOR I:= 1 TO 24 DO WRITELN;

SPECIAL;

FOR I:= 1 TO 6 DO WRITELN;
```

```
    EDFLAG:= TRUE;
    SHOW;
    WRITE('Are these the desired values?   (Y/N)  ');
    READLN(ACHAR);
    IF ACHAR = 'N' THEN GOTO 2;
    SAVESPL
    END;

{ copyright 1982, 1983 Tungsten Industries }

BEGIN
    RESET('MACHDATA',INFILE);
    READLN(INFILE,HTOPX);
    READLN(INFILE,HTOPY);
    READLN(INFILE,HTOSX);
    READLN(INFILE,HTOSY);
    READLN(INFILE,FEED);
    READLN(INFILE,START);
    READLN(INFILE,INCR);
    READLN(INFILE,PEREC);
    READLN(INFILE,OFFSETZ);
    READLN(INFILE,OFFSETA);
    SIGNON;
2:  EDPFOUND:= FALSE;
    EDFLAG:= FALSE;
1:  SETLENGTH(EDPNUM,0);
    WRITE('Enter the desired 9-digit EDP part number, "EDIT" to edit a ');
    WRITELN('burr data file,');
    WRITE('"LIST" to see the list of burrs, or "QUIT" to leave the program.  ');
    READLN(EDPNUM);
    IF EDPNUM = 'QUIT' THEN GOTO 4;
    IF EDPNUM = 'EDIT' THEN EDIT;
    IF EDFLAG = TRUE THEN GOTO 5;
    IF EDPNUM = 'LIST' THEN BEGIN
        LISTDATA;
        GOTO 2
        END;
```

```
   IF LENGTH(EDPNUM) <> 9 THEN BEGIN

WRITELN('ERROR -- invalid entry.');

GOTO 1

END;

OPTCUT:= EDPNUM[7];

OPTGRIND:= EDPNUM[8];

OPTSHANK:= EDPNUM[9];

SEARCH;

IF EDPFOUND = FALSE THEN BEGIN

WRITELN('EDP number was not found');

IF EDPNUM[2] = 'S' THEN BEGIN

WRITE('Is this part a new special case?   (Y/N)   ');

READLN(ACHAR);

IF ACHAR = 'Y' THEN BEGIN

FOR I:= 1 TO 24 DO WRITELN;

SPECIAL;

GOTO 3

END

END;

GOTO 1

END;

3: FOR I:= 1 TO 24 DO WRITELN;

SHOW;

IF OPTERROR = TRUE THEN GOTO 2;

WRITE('Are these the desired part specifications ?   (Y/N)   ');

READLN(ACHAR);

FOR I:= 1 TO 2500 DO EDPOPEN:= 'DUMMY';

FOR I:= 1 TO 24 DO WRITELN;

IF ACHAR = 'N' THEN GOTO 1;

SETLENGTH(EDPOPEN,0);

APPEND(EDPOPEN,'B:');

FOR I:= 1 TO 6 DO BEGIN

ACHAR:= EDPNUM[I];

APPEND(EDPOPEN,ACHAR)

END;

APPEND(EDPOPEN,'.');

FOR I:= 7 TO 9 DO BEGIN

ACHAR:= EDPNUM[I];
```

```
      APPEND(EDPOPEN,ACHAR)
   END;

FLAG:= FALSE;

IF R3 <> 0.0 THEN BEGIN

IF SHELIX = 0.0 THEN CNCBASE:= 'THRERAD' ELSE CNCBASE:= 'STHRERAD';

FLAG:= TRUE

END;

IF (R2 <> 0.0) AND (FLAG = FALSE) THEN BEGIN

IF FA2 > 1.5708 THEN BEGIN

IF SHELIX = 0.0 THEN CNCBASE:= 'TWORAD2' ELSE CNCBASE:= 'STWORAD2'

END

ELSE BEGIN

IF SHELIX = 0.0 THEN CNCBASE:= 'TWORAD1' ELSE CNCBASE:= 'STWORAD1'

END;

FLAG:= TRUE

END;

IF (R1 <> 0.0) AND (FLAG = FALSE) AND (LEN = 0.0) THEN BEGIN

IF FA1 > 1.5708 THEN BEGIN

IF SHELIX = 0.0 THEN CNCBASE:= 'ONERAD2' ELSE CNCBASE:= 'SONERAD2'

END

ELSE BEGIN

IF SHELIX = 0.0 THEN CNCBASE:= 'ONERAD1' ELSE CNCBASE:= 'SONERAD1'

END;

FLAG:= TRUE

END;

IF (R1 <> 0.0) AND (FLAG = FALSE) THEN BEGIN

IF SHELIX = 0.0 THEN CNCBASE:= 'RADLINE' ELSE CNCBASE:= 'SRADLINE';

FLAG:= TRUE

END;

IF (ANG = 0.0) AND (FLAG = FALSE) THEN BEGIN

FLAG:= TRUE;

IF ENDCUT = 1 THEN BEGIN

IF SHELIX = 0.0 THEN CNCBASE:= 'ENDLINE' ELSE CNCBASE:= 'SENDLINE'

END

ELSE IF SHELIX = 0.0 THEN CNCBASE:= 'LINE' ELSE CNCBASE:= 'SLINE'

END;

IF FLAG = FALSE THEN BEGIN

IF ANG > 0.0 THEN BEGIN
```

```
          IF SHELIX = 0.0 THEN CNCBASE:= 'TLINE' ELSE CNCBASE:= 'STLINE'

END

ELSE IF SHELIX = 0.0 THEN CNCBASE:= 'INVLINE' ELSE CNCBASE:= 'SINVLINE'

END;

WRITE('Please wait ... program being generated.  ');

OUTPUT;

FOR I:= 1 TO 24 DO WRITELN;

WRITE('The EDP number ',EDPOPEN:14,' ANORAD file has been generated ');

WRITELN('and stored.');WRITELN;

IF EDPNUM[2] = 'S' THEN BEGIN

WRITE('Would you like to save this special case?   (Y/N)  ');

READLN(ACHAR);

IF ACHAR = 'Y' THEN BEGIN

SAVESPL;

5:      IF EDPNUM = 'EDIT' THEN EDFLAG:= FALSE;

WRITELN('New data file created.');

IF ERASE('BURRBLOK') THEN WRITELN('Old data file erased.')

ELSE WRITELN('Failed in deleting old data file.');

IF RENAME('TEMP','BURRBLOK') THEN WRITELN('New data file named.')

ELSE WRITELN('Failed in renaming new data file.');

WRITELN

END

END;

GOTO 2;

4: END.

{ copyright 1982, 1983 Tungsten Industries  }
```

APPENDIX H

Example Programming Session

The following pages will demonstrate the actual operation of the program generator on the SUPERBRAIN II. Since things are slightly different on the printed page than they appear on the CRT of a computer the printed copy has been enhanced to highlight certain features. As a result the following key will be used.

1. CRT display will be in normal print.
2. Operator input from the keyboard will be in BOLD PRINT.
3. New pages (ie. a cleared screen) will be represented by a dashed line across the whole page 4. Note that all inputs from the user should be made with the CAPS
   LOCK key depressed (other inputs may cause an input error
   message).

The programming session that is printed on the following pages
illustrates the following operations:

1. Generating a new bur program from data.
2. Editing bur profile data.
3. Replacing profile data.
4. Programming a special bur.
5. Saving special bur data.
6. Exiting the program.

```
                      SCREEN IMAGE BEGINS HERE
---------------------------------------------------------------------
A>BURR
---------------------------------------------------------------------

Computer-aided Part Programming

Version 1.0
                           Copyright 1982, 1983

---------------------------------------------------------------------

Programming notes:
  To program a standard burr enter only the full 9-digit EDP number for that
burr.  Special burrs require a "S" for the second digit.  The burr profile is
all that can be programmed to define a burr.  The end cut style, depth of cut,
number of flutes, etc. are all automatically defined by this program.  The
type of input required by each question is specified at the end of each
question.  All character inputs must be in upper case.  All real inputs must
be left justified (i.e. 0.3125 or 1).  Output files will be dumped on the "B:"
drive under the following format:<type and size digits>.<option select digits>

*** WARNING ***
   All first runs of a burr size and type should be tried out by cutting air,
preferably with a worn out grinding wheel mounted.  Extreme care should be used
in verifying the stopping angle of the grinding pass, especially when grinding
a burr with a reverse taper at the shank.  Loading position and finishing angle
should be set as required.  The base data file "BURRBLOK" of burr geometries
has been based upon cutting across the entire blank.  If physical constraints
prohibit this, the data base should be modified using "EDIT".  Be sure that
up-to-date numbers are in the "MACHDATA" file.  Failure to exercise caution
could result in damage to the tool spindle and loss of the grinding wheel.

Enter the desired 9-digit EDP part number, "EDIT" to edit a burr data file,
"LIST" to see the list of burrs, or "QUIT" to leave the program.  LIST
---------------------------------------------------------------------

NOTE -- burr data may not be in order.
```

```
Base EDP number          Description 420250               1/4 X 1/2 CYL BALL NOSE
   420312               5/16 X 3/4 CYL BALL NOSE
   420375               3/8 X 3/4 CYL BALL NOSE
   420437               7/16 X 1 CYL BALL NOSE
   420500               1/2 X 1 CYL BALL NOSE
   420625               5/8 X 1 CYL BALL NOSE
   420750               3/4 X 1 CYL BALL NOSE
   430250                         1/4 BALL
   430312                        5/16 BALL
   430375                         3/8 BALL
   430437                        7/16 BALL
   430500                         1/2 BALL
   430625                         5/8 BALL
   430750                         3/4 BALL
   440250                         1/4 EGG
   440375                         3/8 EGG
   440500                         1/2 EGG
   440625                         5/8 EGG Do you wish to see more?  (Y/N)  Y

------------------------------------------------------------------------

Base EDP number          Description 440750                         3/4 EGG
   490250               1/4 X 22 DEG CONE
   490375               3/8 X 28 DEG CONE
   490500               1/2 X 28 DEG CONE
   490625               5/8 X 31 DEG CONE
   470312                        5/16 FLAME
   470500                         1/2 FLAME
   470625                         5/8 FLAME
   470750                         3/4 FLAME
   480312          5/16 X 1 X 14 DEG B.N. CONE
   480375         3/8 X 1-3/16 X 14 DEG B.N.CONE
   480500         1/2 X 1-1/4 X 14 DEG B.N. CONE
   480625         5/8 X 1-7/16 X 14 DEG B.N.CONE
   480750         3/4 X 1-5/8 X 14 DEG B.N. CONE
   400250               1/4 X 3/16 CYL END CUT
   400251               1/4 X 1/2 CYL END CUT
   400312               5/16 X 3/4 CYL END CUT
   400375               3/8 X 3/4 CYL END CUT Do you wish to see more?  (Y/N)  N Enter the desired 9-digit EDP part number, "EDIT" to edit a burr data file,
"LIST" to see the list of burrs, or "QUIT" to leave the program.  470625100
------------------------------------------------------------------------

The part description for EDP # 470625100 is --                    5/8 FLAME
The maximum diameter is            --    0.6250
The starting angle is              --    0.0000
The helix angle is                 --   25.0000
The M coordinate for r1 is         --   -0.0915
The N coordinate for r1 is         --    0.0000
The length of r1 is                --    0.0915
The finishing angle of r1 is       --    0.7995
The M coordinate for r2 is         --   -0.5488
The N coordinate for r2 is         --   -0.4704
The length of r2 is                --    0.7475
The finishing angle of r2 is       --    1.3532
The M coordinate for r3 is         --   -0.8725
The N coordinate for r3 is         --   -1.9350
The length of r3 is                --    2.2475
The finishing angle of r3 is       --    1.7370
The length of the taper is         --    0.0000
The taper angle is                 --    0.0000
The end diameter is                --    0.0000
The end cut flag is                --    0
The cut is medium (standard)
The grind is right hand spiral only
The shank diameter is 1/4"
Are these the desired part specifications ?   (Y/N)  Y
```

```
Please wait ... program being generated.
------------------------------------------------------------------------
The EDP number   B:470625.100 ANORAD file has been generated and stored.

Enter the desired 9-digit EDP part number, "EDIT" to edit a burr data file,
"LIST" to see the list of burrs, or "QUIT" to leave the program.  EDIT
Enter the first 6 digits of the EDP number.  431000
------------------------------------------------------------------------
NOTE -- For graphic descriptions of variables see programming manual.
        If dimensions are not applicable, enter "0".

The maximum diameter is         --   1.0000
Enter the maximum diameter of the part.     (real)   1
The helix angle is              --  25.0000
Enter the desired helix angle.        (real-degrees) 25
The starting angle is           --   0.0000
Enter the starting angle of r1.       (real-radians) 0
The M coordinate for r1 is      --  -0.5000
Enter the M coordinate of r1.               (real)  -0.5
The N coordinate for r1 is      --   0.0000
Enter the N coordinate of r1.               (real)   0
The length of r1 is             --   0.5000
Enter the length of r1.                     (real)   0.5
The finishing angle of r1 is    --   2.0595
Enter the finishing angle of r1.      (real-radians) 2.0594
The M coordinate for r2 is      --   0.0000
Enter the M coordinate of r2.               (real)   0
The N coordinate for r2 is      --   0.0000
Enter the N coordinate of r2.               (real)   0
The length of r2 is             --   0.0000
Enter the length of r2.                     (real)   0
The finishing angle of r2 is    --   0.0000
Enter the finishing angle of r2.      (real-radians) 0
The M coordinate for r3 is      --   0.0000
Enter the M coordinate of r3.               (real)   0
The N coordinate for r3 is      --   0.0000
Enter the N coordinate of r3.               (real)   0
The length of r3 is             --   0.0000
Enter the length of r3.                     (real)   0
The finishing angle of r3 is    --   0.0000
Enter the finishing angle of r3.      (real-radians) 0
The length of the taper is      --   0.0000
Enter the horizontal length of the taper.   (real)   0
The taper angle is              --   0.0000
Enter the taper angle.                (real-degrees) 0
The end diameter is             --   0.0000
Enter the end diameter.                     (real)   0
The end cut flag is             --   0
Enter the end cut flag.                     (0/1)    0
The part description is         --                         1 BALL
Enter a part description (30 characters maximum)  1 BALL
------------------------------------------------------------------------
The part description for EDP #    431000 is --                  1 BALL
The maximum diameter is              --     1.0000
The starting angle is                --     0.0000
The helix angle is                   --    25.0000
The M coordinate for r1 is           --    -0.5000
The N coordinate for r1 is           --     0.0000
The length of r1 is                  --     0.5000
The finishing angle of r1 is         --     2.0594
The M coordinate for r2 is           --     0.0000
The N coordinate for r2 is           --     0.0000
The length of r2 is                  --     0.0000
The finishing angle of r2 is         --     0.0000
The M coordinate for r3 is           --     0.0000
The N coordinate for r3 is           --     0.0000
The length of r3 is                  --     0.0000
The finishing angle of r3 is         --     0.0000
The length of the taper is           --     0.0000
```

```
The taper angle is                      --   0.0000
The end diameter is                     --   0.0000
The end cut flag is                     --   0
Are these the desired values?    (Y/N)  Y
Please wait ... data file is being modified.
New data file created.
Old data file erased.
New data file named.
Enter the desired 9-digit EDP part number, "EDIT" to edit a burr data file,
"LIST" to see the list of burrs, or "QUIT" to leave the program.  EDIT
Enter the first 6 digits of the EDP number.  431250
Base EDP number was not found.
Is this to be a new data entry?  (Y/N)  Y
--------------------------------------------------------------------------------
NOTE -- For graphic descriptions of variables see programming manual.
        If dimensions are not applicable, enter "0".

Enter the maximum diameter of the part.        (real)   1.25
Enter the desired helix angle.        (real-degrees)    25
Enter the starting angle of r1.       (real-radians)    0
Enter the M coordinate of r1.                  (real)   -0.625
Enter the N coordinate of r1.                  (real)   0
Enter the length of r1.                        (real)   0.625
Enter the finishing angle of r1.      (real-radians)    2.05
Enter the M coordinate of r2.                  (real)   0
Enter the N coordinate of r2.                  (real)   0
Enter the length of r2.                        (real)   0
Enter the finishing angle of r2.      (real-radians)    0
Enter the M coordinate of r3.                  (real)   0
Enter the N coordinate of r3.                  (real)   0
Enter the length of r3.                        (real)   0
Enter the finishing angle of r3.      (real-radians)    0
Enter the horizontal length of the taper.      (real)   0
Enter the taper angle.                (real-degrees)    0
Enter the end diameter.                        (real)   0
Enter the end cut flag.                         (0/1)   0
Enter a part description (30 characters maximum)  1-1/4 BALL BURR
--------------------------------------------------------------------------------
The part description for EDP #     431250 is --                 1-1/4 BALL BURR
The maximum diameter is             --   1.2500
The starting angle is               --   0.0000
The helix angle is                  --   25.0000
The M coordinate for r1 is          --   -0.6250
The N coordinate for r1 is          --   0.0000
The length of r1 is                 --   0.6250
The finishing angle of r1 is        --   2.0500
The M coordinate for r2 is          --   0.0000
The N coordinate for r2 is          --   0.0000
The length of r2 is                 --   0.0000
The finishing angle of r2 is        --   0.0000
The M coordinate for r3 is          --   0.0000
The N coordinate for r3 is          --   0.0000
The length of r3 is                 --   0.0000
The finishing angle of r3 is        --   0.0000
The length of the taper is          --   0.0000
The taper angle is                  --   0.0000
The end diameter is                 --   0.0000
The end cut flag is                 --   0
Are these the desired values?    (Y/N)  Y
Please wait ... data file is being modified.
New data file created.
Old data file erased.
New data file named.
Enter the desired 9-digit EDP part number, "EDIT" to edit a burr data file,
"LIST" to see the list of burrs, or "QUIT" to leave the program.  4S1111100
EDP number was not found
Is this part a new special case?  (Y/N)  Y NOTE -- For graphic descriptions of variables see programming manual.
        If dimensions are not applicable, enter "0".

Enter the maximum diameter of the part.        (real)   0.6
Enter the desired helix angle.        (real-degrees)    25
Enter the starting angle of r1.       (real-radians)    0
Enter the M coordinate of r1.                  (real)   0
```

```
Enter the N coordinate of r1.              (real)          0
Enter the length of r1.                    (real)          0
Enter the finishing angle of r1.    (real-radians)         0
Enter the M coordinate of r2.              (real)          0
Enter the N coordinate of r2.              (real)          0
Enter the length of r2.                    (real)          0
Enter the finishing angle of r2.    (real-radians)         0
Enter the M coordinate of r3.              (real)          0
Enter the N coordinate of r3.              (real)          0
Enter the length of r3.                    (real)          0
Enter the finishing angle of r3.    (real-radians)         0
Enter the horizontal length of the taper.  (real)          0.8
Enter the taper angle.              (real-degrees)        13.5
Enter the end diameter.                    (real)          0.2159
Enter the end cut flag.                    (0/1)           0
Enter a part description (30 characters maximum)  DUMMY TAPER CYLINDER BURR
-----------------------------------------------------------------------------
The part description for EDP # 4S1111100 is  --    DUMMY TAPER CYLINDER BURR
The maximum diameter is           --      0.6000
The starting angle is             --      0.0000
The helix angle is                --     25.0000
The M coordinate for r1 is        --      0.0000
The N coordinate for r1 is        --      0.0000
The length of r1 is               --      0.0000
The finishing angle of r1 is      --      0.0000
The M coordinate for r2 is        --      0.0000
The N coordinate for r2 is        --      0.0000
The length of r2 is               --      0.0000
The finishing angle of r2 is      --      0.0000
The M coordinate for r3 is        --      0.0000
The N coordinate for r3 is        --      0.0000
The length of r3 is               --      0.0000
The finishing angle of r3 is      --      0.0000
The length of the taper is        --      0.8000
The taper angle is                --     13.5000
The end diameter is               --      0.2159
The end cut flag is               --      0
The cut is medium (standard)
The grind is right hand spiral only
The shank diameter is 1/4"
Are these the desired part specifications ?   (Y/N)   Y
-----------------------------------------------------------------------------

Please wait ... program being generated.
-----------------------------------------------------------------------------
The EDP number   B:4S1111.100 ANORAD file has been generated and stored.

Would you like to save this special case?   (Y/N)   Y
Please wait ... data file is being modified.
New data file created.
Old data file erased.
New data file named.

Enter the desired 9-digit EDP part number, "EDIT" to edit a burr data file,
"LIST" to see the list of burrs, or "QUIT" to leave the program.   QUIT

A>

-----------------------------------------------------------------------------
                        SCREEN IMAGE ENDS HERE
```

That which is claimed is:

1. A process for producing a machined article from an elongated blank, comprising the steps of:
   providing an apparatus which comprises:
   a chuck for holding said elongated blank,
   means for rotating said elongated blank about a B axis, said B axis providing rotation about the central axis of said blank,
   means for rotating said chuck in a horizontal plane about a Z axis,
   means for moving said said means for rotating said chuck about a Y axis in a horizontal plane,
   means for moving said means for moving along said Y axis about an X axis in a horizontal plane which is perpendicular to said Y axis,
   a generally circular cutting wheel,
   means for rotating said cutting wheel about the center thereof,
   means for rotating said cutting wheel about an A axis perpendicular to the axis of rotation of said wheel, means for measuring movement along each of said A, B, X, Y, and Z axes;

rotating said cutting wheel about the center axis thereof;

rotating said cutting wheel about said A axis;

rotating said elongated blank about said B axis;

moving said blank along said X, Y, and Z axes so as to engage said blank with said cutting wheel;

measuring the movement along said A, B, X, Y, and Z axes;

generating signals representative of said measurement along said axes;

establishing predetermined desired geometrical ratios with regard to the desired configuration of the machined blank;

assigning specific dimensional measurements which relate to said ratios to establish absolute predetermined desired measurements;

transposing said desired ratios into movement along said A, B, X, Y and Z axes;

comparing said signals with predetermined desired signals representative of said predetermined desired geometrical ratios; and generating desired paths of movement for all axes simultaneously to maximize utilization of all available axes;

controlling movement along all said axes simultaneously along said path.

2. The process according to claim 1 wherein said apparatus further comprises a probe for measuring the dimensions of said elongated blank and of said cutting wheel and generating a signal therefrom to be utilized in said step of comparing.

3. The process according to claim 1 wherein said step of measuring is conducted utilizing optical encoders.

4. The process according to claim 1 wherein said control means comprises means for controlling movement along said axes and means for programming said means for controlling movement and further comprising the steps of identifying parameters defining the geometry of and dimensions of the machined article, providing said parameters to said means for programming whereby said means for programming programs said means for controlling movement to provide for controlled movement to produce the desired said machined article.

5. The process according to claim 1 comprising additional steps of generating paths for all axes to follow in response to continued steps of measuring.

* * * * *